(12) United States Patent
Huang et al.

(10) Patent No.: US 11,507,425 B2
(45) Date of Patent: Nov. 22, 2022

(54) COMPUTE INSTANCE PROVISIONING BASED ON USAGE OF PHYSICAL AND VIRTUAL COMPONENTS

(71) Applicant: Huawei Cloud Computing Technologies Co., Ltd., Guizhou (CN)

(72) Inventors: Chaoyi Huang, Shenzhen (CN); Jiongjiong Gu, Shenzhen (CN); Xiaoyong Min, Shenzhen (CN); Zhiyuan Cai, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 15 days.

(21) Appl. No.: 16/951,157

(22) Filed: Nov. 18, 2020

(65) Prior Publication Data
US 2021/0149735 A1    May 20, 2021

(30) Foreign Application Priority Data

Nov. 19, 2019 (CN) .......................... 201911133776.X
Dec. 31, 2019 (CN) .......................... 201911424243.7

(51) Int. Cl.
| | |
|---|---|
| *G06F 9/50* | (2006.01) |
| *G06F 9/48* | (2006.01) |
| *H04L 67/1097* | (2022.01) |
| *H04L 67/148* | (2022.01) |
| *H04L 67/61* | (2022.01) |

(52) U.S. Cl.
CPC .......... *G06F 9/5027* (2013.01); *G06F 9/4881* (2013.01); *G06F 9/5088* (2013.01); *H04L 67/1097* (2013.01); *H04L 67/148* (2013.01); *H04L 67/61* (2022.05)

(58) Field of Classification Search
CPC .... G06F 9/5027; G06F 9/4881; G06F 9/5088; H04L 67/1097; H04L 67/148; H04L 67/322
See application file for complete search history.

(56) References Cited

U.S. PATENT DOCUMENTS

| | | | |
|---|---|---|---|
| 8,732,291 B2 | 5/2014 | Zhu et al. | |
| 8,949,848 B2 | 2/2015 | Heninger et al. | |
| 9,720,727 B1 | 8/2017 | Vincent et al. | |
| 10,884,778 B1 * | 1/2021 | Dunagan | G06F 9/45558 |
| 2012/0023492 A1 | 1/2012 | Govindan et al. | |
| 2013/0290511 A1 * | 10/2013 | Tu | G06F 9/5072 709/224 |

(Continued)

FOREIGN PATENT DOCUMENTS

| | | |
|---|---|---|
| CN | 105074651 A | 11/2015 |
| WO | 2016040743 A1 | 3/2016 |

*Primary Examiner* — Viet D Vu
(74) *Attorney, Agent, or Firm* — Conley Rose, P.C.

(57) ABSTRACT

According to a compute instance scheduling method, usage of a physical resource included in each computer, and usage of a physical resource occupied by a compute instance running on each computer in a compute instance provisioning system are collected. Then, a compute instance in the compute instance provisioning system is scheduled based on the usage of the physical resource in each computer and the usage of the physical resource occupied by the compute instance running on each computer.

26 Claims, 10 Drawing Sheets

Compute instance provisioning system 200

(56) References Cited

U.S. PATENT DOCUMENTS

| | | | |
|---|---|---|---|
| 2014/0250439 A1* | 9/2014 | Parashar | G06F 9/5083 |
| | | | 718/104 |
| 2015/0106520 A1* | 4/2015 | Breitgand | H04L 43/16 |
| | | | 709/226 |
| 2015/0350055 A1 | 12/2015 | Hyser et al. | |
| 2017/0324810 A1* | 11/2017 | Billore | H04L 41/0893 |
| 2017/0346760 A1* | 11/2017 | Kelly | H04L 47/805 |

* cited by examiner ced by the compute instance running on each computer; and migrating a compute instance or creating a compute instance, by a scheduling apparatus, in the compute instance provisioning system based on the usage of the physical resource in the at least one computer and the usage of the physical resource occupied by the compute instance running on the at least one computer.

COMPUTE INSTANCE PROVISIONING BASED ON USAGE OF PHYSICAL AND VIRTUAL COMPONENTS

CROSS-REFERENCE TO RELATED APPLICATIONS

This claims priority to Chinese Patent App. No. 201911424243.7, filed on Dec. 31, 2019, and Chinese Patent App. No. 201911133776.X, filed on Nov. 19, 2019, which are incorporated by reference.

FIELD

This disclosure relates to the field of computer technologies, and in particular, to a compute instance scheduling method, an apparatus for performing the method, and a compute instance provisioning system.

BACKGROUND

In a public cloud scenario, a cloud service provider provides a compute instance, for example, a virtual machine (VM), a container, or a process, for a tenant to run a service of the tenant. The tenant can quickly obtain the compute instance by using a public cloud. This greatly improves a speed of deploying the service by the tenant. In addition, compute instances provided by the cloud service provider can be used by a plurality of tenants, and can share hardware. The tenants do not need to maintain the hardware that supports running of the compute instances, and this reduces service running costs for the tenant.

From a perspective of the cloud service provider, the cloud service provider needs to provide more compute instances on same hardware as much as possible while ensuring a quality of service (QoS) of the service run by the tenant, to reduce costs of the tenant using the compute instance. Therefore, the cloud service provider needs to schedule the compute instance. However, an existing compute instance scheduling method has low precision.

SUMMARY

This disclosure provides a compute instance scheduling method, to improve precision of scheduling a compute instance.

According to a first aspect, a compute instance scheduling method is provided. The method is applied to a compute instance provisioning system. The compute instance provisioning system includes at least one computer. Each computer includes a plurality of physical resources to support running of at least one compute instance. The method includes: collecting, by a scheduling agent on each computer, usage of a physical resource included in each computer, and usage of a physical resource occupied by a compute instance running on each computer; and migrating a compute instance or creating a compute instance, by a scheduling apparatus, in the compute instance provisioning system based on the usage of the physical resource in the at least one computer and the usage of the physical resource occupied by the compute instance running on the at least one computer.

In the method, the usage of the physical resource included in each computer and the usage of the physical resource occupied by the compute instance are introduced into compute instance scheduling, to improve precision of scheduling the compute instance.

In a possible implementation, the migrating a compute instance or creating a compute instance in the compute instance provisioning system based on the usage of the physical resource in the at least one computer and the usage of the physical resource occupied by the compute instance running on the at least one computer includes: calculating, by the scheduling agent, a parameter of a remaining physical resource in each computer based on the usage of the physical resource in each computer; calculating, by the scheduling agent, based on the usage of the physical resource occupied by the compute instance running on each computer, a QoS parameter of the compute instance running on each computer; calculating, by the scheduling agent, a QoS parameter of each computer based on the QoS parameter of the compute instance running on each computer; sending, by the scheduling agent, the obtained parameter of the remaining physical resource in the computer and the QoS parameter of the compute instance through calculation to the scheduling apparatus; and then, migrating the compute instance or creating the compute instance, by the scheduling apparatus, in the compute instance provisioning system based on the parameter of the remaining physical resource in the at least one computer and the QoS parameter of the at least one computer.

The QoS parameter of the compute instance and the QoS parameter of the computer are calculated. The QoS parameter of the compute instance and the QoS parameter of the computer are used in a subsequent process of scheduling the compute instance. This improves precision of scheduling a resource in the computer, the precision of scheduling the compute instance, and utilization of the physical resource in the computer.

In a possible implementation, the migrating the compute instance or creating the compute instance in the compute instance provisioning system based on the parameter of the remaining physical resource in the at least one computer and the QoS parameter of the at least one computer includes: obtaining, by the scheduling apparatus, a compute instance scheduling request, where the compute instance scheduling request indicates to migrate the compute instance or create the compute instance in the compute instance provisioning system; selecting in the at least one computer, based on the parameter of the remaining physical resource in the at least one computer and the QoS parameter of the at least one computer, a computer configured to deploy the migrated compute instance or the created compute instance; and then, deploying, the migrated compute instance or the created compute instance on the selected computer indicated by the scheduling apparatus.

In a possible implementation, the method further includes: determining a compute instance that runs on each computer and whose QoS parameter exceeds a QoS parameter threshold; and performing QoS control on the compute instance whose QoS parameter exceeds the QoS parameter threshold, where the QoS control includes isolating at least one physical resource in a computer on which the compute instance whose QoS parameter exceeds the QoS parameter threshold is located, for exclusive use by the compute instance whose QoS parameter exceeds the QoS parameter threshold, and/or scheduling another compute instance running on the computer on which the compute instance whose QoS parameter exceeds the QoS parameter threshold is located.

The compute instance whose QoS parameter exceeds the QoS parameter threshold is controlled, to ensure QoS of the compute instance, and improve tenant's experience.

In a possible implementation, the at least one isolated physical resource includes any one or more of the following: a memory device, a central processing unit (CPU) core, a last level cache LLC, and a memory bandwidth.

In a possible implementation, the scheduling another compute instance running on the computer on which the compute instance whose QoS parameter exceeds the QoS parameter threshold is located includes: calculating, based on a QoS parameter of a compute instance running on the computer on which the compute instance whose QoS parameter exceeds the QoS parameter threshold is located, an interference coefficient of the another compute instance running on the computer on which the compute instance whose QoS parameter exceeds the QoS parameter threshold is located; and scheduling, based on the interference coefficient of the another compute instance running on the computer on which the compute instance whose QoS parameter exceeds the QoS parameter threshold is located, the another compute instance running on the computer on which the compute instance whose QoS parameter exceeds the QoS parameter threshold is located.

When there is the compute instance whose QoS parameter exceeds the QoS parameter threshold, the interference coefficient of the another compute instance on the local computer is determined, to determine a to-be-migrated compute instance. This ensures the QoS of the compute instance, and improves the precision of scheduling the compute instance.

In a possible implementation, the method further includes: determining, by the scheduling agent, that after the QoS control, a QoS parameter of the compute instance whose QoS parameter exceeds the QoS parameter threshold still exceeds the QoS parameter threshold; and generating, by the scheduling agent, a computer instance scheduling request used to migrate the compute instance whose QoS parameter exceeds the QoS parameter threshold.

According to a second aspect, a scheduling agent is provided, including a communications module, a collection module, a QoS parameter calculation module, and a control module, where the collection module is configured to collect, on a local computer of the scheduling agent, usage of a physical resource included in the local computer and usage of a physical resource occupied by a compute instance running on the local computer; the QoS parameter calculation module is configured to: calculate a parameter of a remaining physical resource in the local computer based on the usage of the physical resource in the local computer; calculate, based on the usage of the physical resource occupied by the compute instance running on the local computer, a QoS parameter of the compute instance running on the local computer; and calculate a QoS parameter of the local computer based on the QoS parameter of the compute instance running on the local computer; the communications module is configured to: send the QoS parameter of the local computer and the parameter of the remaining physical resource in the local computer to a scheduling apparatus; and receive a compute instance scheduling command that is sent by the scheduling apparatus based on the QoS parameter of the local computer and the parameter of the remaining physical resource in the local computer; and the control module is configured to deploy a migrated compute instance or a created compute instance on the local computer according to the compute instance scheduling command.

In a possible implementation, the control module is configured to: determine a compute instance that runs on the local computer and whose QoS parameter exceeds a QoS parameter threshold; and perform QoS control on the compute instance whose QoS parameter exceeds the QoS parameter threshold, where the QoS control includes isolating at least one physical resource in the local computer for exclusive use by the compute instance whose QoS parameter exceeds the QoS parameter threshold, and/or scheduling another compute instance running on the local computer.

In a possible implementation, the at least one isolated physical resource includes any one or more of the following: a memory device, a CPU core, a last level cache LLC, and a memory bandwidth.

In a possible implementation, the control module is configured to: calculate, based on the QoS parameter of the compute instance running on the local computer, an interference coefficient of the another compute instance running on the local computer; and schedule the another compute instance running on the local computer based on the interference coefficient of the another compute instance running on the local computer.

In a possible implementation, the control module is configured to: determine that after the QoS control, a QoS parameter of the compute instance whose QoS parameter exceeds the QoS parameter threshold still exceeds the QoS parameter threshold; and generate another compute instance scheduling request, where the another compute instance scheduling request is used to migrate the compute instance whose QoS parameter exceeds the QoS parameter threshold; and the communications module is configured to send the another compute instance scheduling request to the scheduling apparatus.

According to a third aspect, a scheduling apparatus is provided. The scheduling apparatus is applied to a compute instance provisioning system. The compute instance provisioning system includes at least one computer. The scheduling apparatus includes a communications module and a scheduling module, where the communications module is configured to: receive a parameter of a remaining physical resource in each of the at least one computer and a QoS parameter of each of the at least one computer; and receive a compute instance scheduling request, where the compute instance scheduling request is used to migrate a compute instance or create a compute instance in the compute instance provisioning system; and the scheduling module is configured to: select in the at least one computer, based on the parameter of the remaining physical resource of the at least one computer and the QoS parameter of the at least one computer, a computer configured to deploy the migrated compute instance or the created compute instance; and generate a compute instance scheduling command based on a selection result, where the compute instance scheduling command is used to deploy the migrated compute instance or the created compute instance on the selected computer, and the communications module is further configured to send the compute instance scheduling command to the selected computer.

The second aspect, the possible implementations of the second aspect, the third aspect, and the possible implementations of the third aspect correspond to the first aspect and the possible implementations of the first aspect. Therefore, details are not described herein again.

According to a fourth aspect, a compute instance provisioning system is provided, including at least one computer. Each computer includes a processor and a storage device. The processor of the at least one computer is configured to execute an instruction in the storage device of the at least one computer, to perform the method according to any one of the first aspect and the possible implementations of the first aspect.

According to a fifth aspect, a compute instance provisioning system is provided, including at least one computer. Each computer includes a processor and a memory device. The processor of the at least one computer is configured to execute an instruction in the memory device of the at least one computer, to perform the method according to any one of the first aspect and the possible implementations of the first aspect. Compared with the fourth aspect in which a non-running state of the compute instance provisioning system is described, the fifth aspect is used to describe a running state of the compute instance provisioning system.

According to a sixth aspect, a non-transient readable storage medium is provided. When an instruction stored in the non-transient readable storage medium is executed by a compute instance provisioning system, the system performs the method provided in the first aspect and the possible implementations of the first aspect. The storage medium stores a program instruction. The storage medium includes but is not limited to a volatile storage device, for example, a random-access storage device, and a nonvolatile storage device, for example, a flash storage device, a hard disk drive (HDD), and a solid-state drive (SSD).

According to a seventh aspect, a computer program product is provided. When an instruction included in the computer program product is executed by a compute instance provisioning system, the system performs the method provided in the first aspect and the possible implementations of the first aspect. The computer program product may be a software installation package. When the method provided in the first aspect and the possible implementations of the first aspect needs to be used, the computer program product may be downloaded. An instruction included in the computer program product may be executed in the compute instance provisioning system.

BRIEF DESCRIPTION OF THE DRAWINGS

To describe the technical methods in embodiments more clearly, the following briefly describes the accompanying drawings for describing the embodiments.

DETAILED DESCRIPTION

The following describes the technical methods in embodiments with reference to the accompanying drawings. In the accompanying drawings, existence of an apparatus/module represented by a dashed line is optional, and steps represented by a dashed line are optional.

Figure 1:
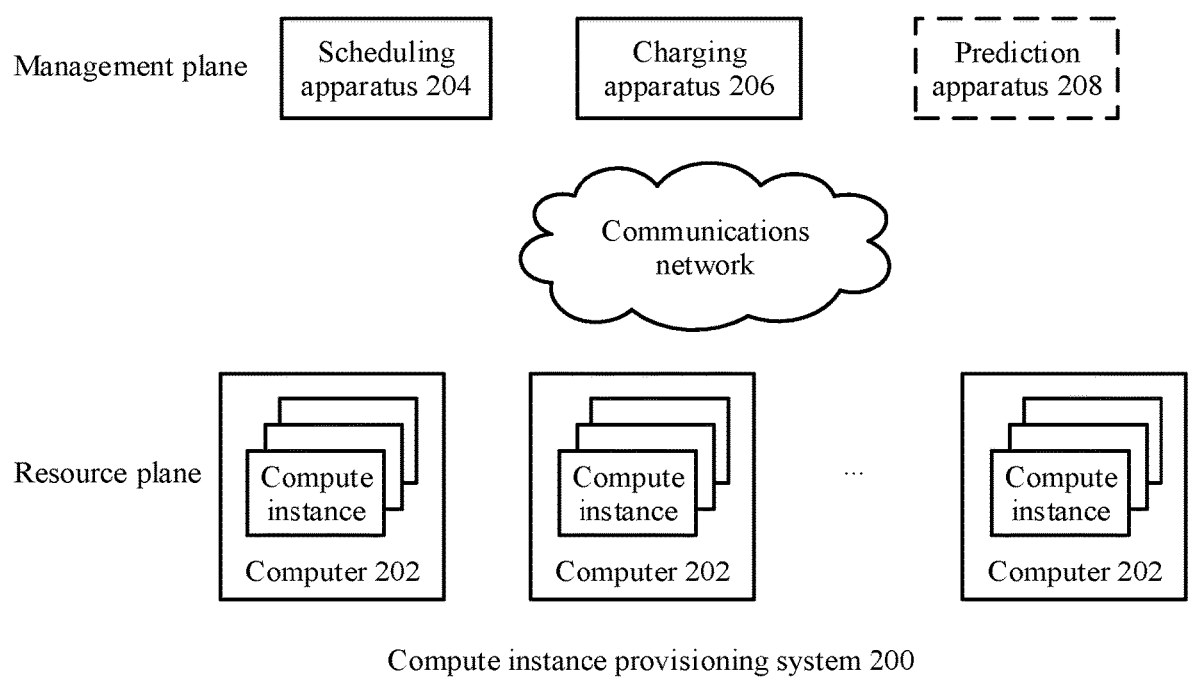
FIG. 1 is a schematic diagram of a structure of a compute instance provisioning system.

FIG. 1 is a compute instance provisioning system 200. The compute instance provisioning system 200 includes a management plane and a resource plane. The resource plane includes a plurality of computers 202 to provide compute resources, and at least one compute instance runs on each computer. A compute instance may be a computational unit configured to run a service, for example, a VM, a container, or a process.

The management plane includes a plurality of computers, and is configured to manage the resource plane. The management plane includes a scheduling apparatus 204 and a charging apparatus 206. Optionally, the management plane further includes a prediction apparatus 208. The apparatuses and the computers 202 are connected to each other through a communications network. The computer 202 may be an entity having a compute capability, for example, a personal computer (PC) or a server. The communications network may be a wired communications network, or may be a wireless communications network, for example, a 5th generation (5G) mobile communications technology system, a Long-Term Evolution (LTE) system, or Wi-Fi.

The scheduling apparatus 204 is configured to schedule a compute instance, for example, provision of a new compute instance, migration of an existing compute instance, and management of a life cycle of the existing compute instance. The charging apparatus 206 is configured to charge for a tenant using the compute instance, and generate a bill. FIG. 1 shows only an example of a part of the management plane and the resource plane. In an actual compute instance provisioning system 200, the management plane may include more management apparatuses, and the resource plane may also include another resource, for example, a network resource. The prediction apparatus 208 is configured to predict a QoS parameter of a remaining physical resource in the computer and/or of the computer.

In the compute instance provisioning system 200, physical resources of each computer 202 are shared by the compute instance running on the computer 202. When compute instances running on a same computer 202 run, these compute instances contend for the physical resources on the computer 202. As a result, performance of the compute instances is deteriorated and a QoS of talent's services running on the compute instances is affected. A priority may be set for the compute instance. The compute instance provisioning system 200 may need to ensure a QoS of a high-priority compute instance.

However, the compute instances running on the same computer 202 may belong to a same tenant, or belong to different tenants. Even if the compute instances running on the same computer 202 belong to the same tenant, services running on these compute instances may be different. For different types of services, measurement standards for QoS cared by the tenant are different. For example, a measurement standard for QoS of a video transcoding service may be a transcoding speed. A measurement standard for QoS of a database service, for example, MySQL and a remote dictionary service (Redis) may be a quantity of requests that can be concurrently performed per unit of time. It is clear that the measurement standards for the QoS of the different services may also have different requirements for physical resources required by compute instances running the services.

Figure 2:
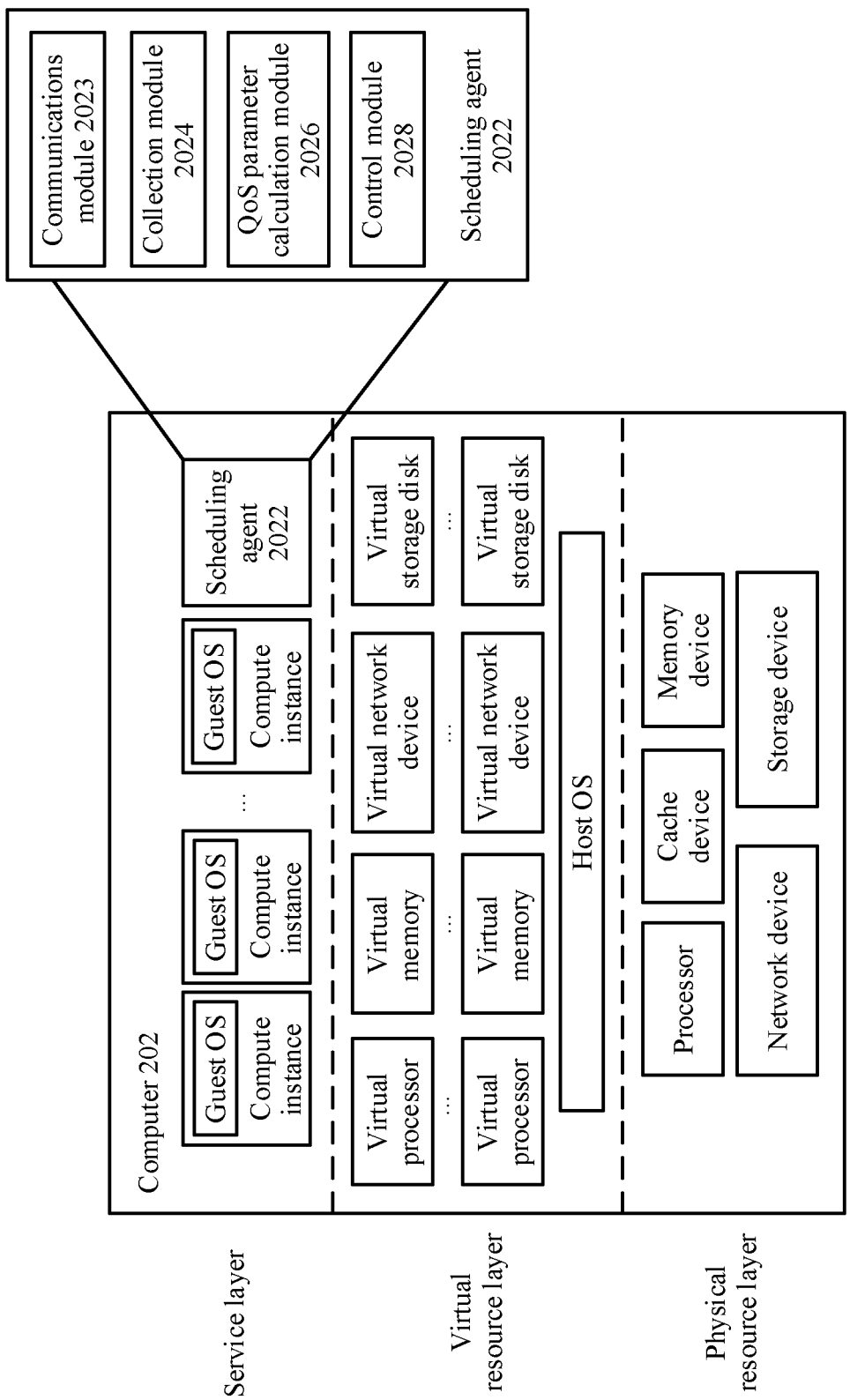
FIG. 2 is a schematic diagram of a structure of a computer.

In the computer 202 shown in FIG. 2, a physical resource layer includes various physical resources, such as a processor, a cache device, a memory device, a network device (for example, a network adapter), and a storage device (an HDD, an SSD, or a nonvolatile storage device of another type).

At the physical resource layer, a host operating system (OS) is running. Virtualization software runs in the host OS. By using the virtualization software, a physical resource at the physical resource layer is virtualized into a virtual resource for the compute instance to use. For example, the processor is virtualized into a virtual CPU (vCPU), the memory device is virtualized into a virtual memory, the network device is virtualized into a virtual network device, and the storage device is virtualized into a virtual storage disk. The processor at the physical resource layer may be virtualized into one or more virtual processors. The network device at the physical resource layer may be virtualized into one or more virtual network devices. The memory device at the physical resource layer may be virtualized into one or more virtual memories. For example, one 8 GB memory card may be virtualized into two 4 GB virtual memories for two compute instances to use. The storage device at the physical resource layer may be virtualized into one or more virtual storage disks. For example, one 400 GB storage device may be virtualized into two 200 GB virtual storage disks for two compute instances to use. The cache device usually does not need to be virtualized. Compute instances running on the computer 202 share the cache device at the physical resource layer.

In another scenario, a virtual storage disk at the virtual resource layer of the computer 202 is not virtualized by using the storage device in the computer 202, but is virtualized by using a storage device in another computer at the resource plane of the compute instance provisioning system 200. In this case, a virtual storage disk occupied by each compute instance on the computer 202 is actually provided by the storage device in the another computer. The virtual storage disk at the virtual resource layer is virtualized by the storage device in the another computer. An operation performed by the compute instance on the computer 202 on the virtual storage disk is sent to the another computer by using the network device, and the storage device of the another computer completes the operation.

A service layer includes at least one compute instance. Each compute instance occupies some virtual resources in the computer 202 when being created. A guest OS runs on a compute instance of a VM type (as shown in FIG. 2), and the tenant runs a service of the tenant on the Guest OS. A compute instance of a container or process type does not need to run the guest OS. The tenant can directly run the service on the compute instance (not shown in FIG. 2). A scheduling agent 2022 further runs at the service layer. The scheduling agent 2022 may obtain parameters of various physical resources by using the host OS. A compute instance running on a computer on which the scheduling agent 2022 is located is referred to as a local compute instance of the scheduling agent 2022.

A cloud service provider takes control of the physical resource layer and a virtual resource layer. Based on the physical resource layer and the virtual resource layer, the scheduling apparatus 204 creates a compute instance for the tenant and installs the guest OS according to a requirement of the tenant. However, based on tenant's data privacy and security, the cloud service provider cannot learn of what services are installed on the guest OS by the tenant. Naturally, the cloud service provider also does not know a measurement standard for QoS of a service installed on each compute instance by the tenant. Consequently, the scheduling apparatus 204 cannot accurately schedule the compute instance.

Based on the foregoing problem, in the compute instance provisioning system 200, the scheduling agent 2022 is deployed on each computer 202. The parameters of the various physical resources of the computer 202 are collected by the scheduling agent 2022 to evaluate QoS of the computer 202 and QoS of each compute instance running on the computer 202. Then, a control measure or scheduling is performed on the compute instance on the computer 202 based on an evaluation result, to improve scheduling precision of the compute instance provisioning system 200, and ensure the QoS of the tenant's service running on the compute instance provisioning system 200.

Various parameters used in this disclosure are first described.

1. A parameter of a computer-level physical resource

A total quantity of cores in a CPU indicates a total quantity of cores in a CPU included at a physical resource layer. A compute task undertaken by the computer 202 in the compute instance provisioning system 200 is usually heavy. Therefore, a physical resource layer of each computer 202 includes one or more CPU sockets. One CPU is inserted into each CPU socket. Each CPU usually includes a plurality of cores, such as a 32-core CPU, a 64-core CPU. Therefore, the total quantity of cores in the CPU is equal to a value obtained by multiplying a quantity of CPUs by a quantity of cores in each CPU. Each CPU socket corresponds to one or more local memory devices. Each CPU socket may also gain access to a local memory device corresponding to another CPU socket, which is referred to as a remote memory device.

Total CPU usage indicates a total CPU usage ratio of a computer. The total CPU usage ratio is obtained by the scheduling agent 2022 in a sampling period, and is usually displayed as a percentage of a CPU usage frequency to a CPU primary frequency. When CPUs are deployed on the computer, the total CPU usage can be an average of usage of the plurality of CPUs.

Total memory usage indicates usage of all memory devices of a computer. The usage of all memory devices is obtained by the scheduling agent 2022 in a sampling period, and may be displayed by using a capacity of a used memory device in the sampling period, or may be displayed by using a ratio of a capacity of a used memory device to a total capacity of the memory devices in the sampling period.

A total quantity of network received bytes indicates a total size (in bytes) of data packets received by all network devices of a computer. The total size of the data packets is obtained by the scheduling agent 2022 in a sampling period.

A total quantity of network received packets indicates a quantity of data packets received by all network devices of a computer. The quantity of data packets is obtained by the scheduling agent 2022 in a sampling period.

A total quantity of network transmit bytes indicates a total size (in bytes) of data packets transmitted by all network devices of a computer. The total size of the data packets is obtained by the scheduling agent 2022 in a sampling period.

A total quantity of network transmit packets indicates a quantity of data packets transmitted by all network devices of a computer. The quantity of data packets is obtained by the scheduling agent 2022 in a sampling period.

A total quantity of storage reads indicates a quantity of read operations performed on all storage devices of a computer. The quantity of read operations is obtained by the scheduling agent 2022 in a sampling period. A storage device of the computer may be disposed in a local storage device of the computer 202. The storage device of the computer may also indicate a storage device that is disposed in another computer but is allocated to the computer for use.

A total quantity of storage writes indicates a quantity of write operations performed on all storage devices of a computer. The quantity of write operations is obtained by the scheduling agent 2022 in a sampling period.

A total quantity of storage read bytes indicates a size (in bytes) of data that is obtained by performing a read operation on all storage devices of a computer. The size of data is obtained by the scheduling agent 2022 in a sampling period.

A total quantity of storage write bytes indicates a size (in bytes) of data that is written by performing a write operation on all storage devices of a computer. The size of data is obtained by the scheduling agent 2022 in a sampling period.

Further, the scheduling agent 2022 may obtain another parameter of the computer-level physical resource based on the parameter of the computer-level physical resource.

A total quantity of storage read megabytes per second (MBps) is calculated based on the total quantity of storage read bytes and a sampling period, and may be equal to a value obtained by dividing the total quantity of storage read bytes by (1024×1024× Sampling period).

A total quantity of storage write MBPS is calculated based on the total quantity of storage write bytes and a sampling period, and may be equal to a value obtained by dividing the total quantity of storage write bytes by (1024×1024× Sampling period).

A total quantity of storage read input/output operations per second (IOPS) is calculated based on the total quantity of storage reads and a sampling period, and may be equal to a value obtained by dividing the total quantity of storage reads by the sampling period.

A total quantity of storage write IOPS is calculated based on the total quantity of storage writes and a sampling period, and may be equal to a value obtained by dividing the total quantity of storage writes by the sampling period.

A total network received bandwidth is calculated based on the total quantity of network received bytes and a sampling period, and may be equal to a value obtained by dividing the total quantity of network received bytes by (1024×1024× Sampling period).

A total network transmit bandwidth is calculated based on the total quantity of network transmit bytes and a sampling period, and may be equal to a value obtained by dividing the total quantity of network transmit bytes by (1024×1024× Sampling period).

A total quantity of network received packets per second (PPS) is calculated based on the total quantity of network received packets and a sampling period, and may be equal to a value obtained by dividing the total quantity of network received packets by the sampling period.

A total quantity of network transmit PPS is calculated based on the total quantity of network transmit packets and a sampling period, and may be equal to a value obtained by dividing the total quantity of network transmit packets by the sampling period.

During calculation of the foregoing computer-level physical resources, the total quantity of cores in the CPU, a total memory capacity, a total available network received bandwidth, a total available network transmit bandwidth, a total quantity of available network received PPS, a total quantity of available network transmit PPS, a total quantity of available storage read MBPS, a quantity of available storage write MBPS, a quantity of available storage write IOPS, and a quantity of available storage read IOPS are maximum values of physical resources that can be provided by the physical resource layer of the computer. For example, the total memory capacity is a maximum available memory capacity provided by the memory device of the computer. The total available network received bandwidth is a maximum available network received bandwidth provided by the network device of the computer.

The parameters of the computer-level physical resources are collected from a dimension of the computer. In other words, parameters of various physical resources in the computer are obtained, and indicate usage of the various physical resources included in the computer.

When the parameters of the computer-level physical resources are obtained, corresponding timestamps and computer identities (IDs) are recorded as parts of the parameters. A recording manner is, for example, a computer ID-a timestamp-a parameter type-a parameter.

2. The scheduling agent 2022 may obtain a parameter of a remaining physical resource in the computer based on the parameter of the computer-level physical resource.

A quantity of remaining available cores in a CPU is calculated based on the total quantity of cores in the CPU and the total CPU usage, and may be equal to a value obtained by subtracting a product of the total quantity of cores in the CPU and the total CPU usage from the total quantity of cores in the CPU. Optionally, a quantity of reserved cores in a CPU may further be set for the computer 202, and a quantity of remaining available cores in the CPU is calculated based on the total quantity of cores in the CPU, the total CPU usage, and the quantity of reserved cores in the CPU, and may be equal to a value obtained by subtracting the quantity of reserved cores in the CPU and a product of the total quantity of cores in the CPU and the total CPU usage from the total quantity of cores in the CPU.

Remaining available memory usage is calculated based on the total memory capacity and the total memory usage of a computer, and may be equal to a value obtained by subtracting the total memory usage from the total memory capacity. Optionally, reserved memory usage may further be set for the computer 202, and remaining available memory usage is calculated based on the total memory capacity, the total memory usage, and the reserved memory usage, and may be equal to a value obtained by subtracting the total memory usage and the reserved memory usage from the total memory capacity.

A remaining available network received bandwidth is calculated based on the total available network received bandwidth and the total network received bandwidth of a computer, and may be equal to a value obtained by subtracting the total network received bandwidth from the total available network received bandwidth. Optionally, a reserved network received bandwidth may further be set for the computer 202, and a remaining available network received bandwidth is calculated based on the total available network received bandwidth, the total network received bandwidth, and the reserved network received bandwidth, and may be equal to a value obtained by subtracting the total network received bandwidth and the reserved network received bandwidth from the total available network received bandwidth.

A remaining available network transmit bandwidth is calculated based on the total available network transmit bandwidth and the total network transmit bandwidth of a computer, and may be equal to a value obtained by subtracting the total network transmit bandwidth from the total available network transmit bandwidth. Optionally, a reserved network transmit bandwidth may further be set for the computer 202, and a remaining available network transmit bandwidth is calculated based on the total available network transmit bandwidth, the total network transmit bandwidth, and the reserved network transmit bandwidth, and may be equal to a value obtained by subtracting the total network transmit bandwidth and the reserved network transmit bandwidth from the total available network transmit bandwidth.

A quantity of remaining available network received PPS is calculated based on the total quantity of available network received PPS and the total quantity of network received PPS of a computer, and may be equal to a value obtained by subtracting the total quantity of network received PPS from the total quantity of available network received PPS. Optionally, a quantity of reserved network received PPS may further be set for the computer 202, and a quantity of remaining available network received PPS is calculated based on the total quantity of available network received PPS, the total quantity of network received PPS, and the quantity of reserved network received PPS, and may be equal to a value obtained by subtracting the total quantity of network received PPS and the quantity of reserved network received PPS from the total quantity of available network received PPS.

A quantity of remaining available network transmit PPS is calculated based on the total quantity of available network transmit PPS and the total quantity of network transmit PPS of a computer, and may be equal to a value obtained by subtracting the total quantity of network transmit PPS from the total quantity of available network transmit PPS. Optionally, a quantity of reserved network transmit PPS may further be set for the computer 202, and a quantity of remaining available network transmit PPS is calculated based on the total quantity of available network transmit PPS, the total quantity of network transmit PPS, and the quantity of reserved network transmit PPS, and may be equal to a value obtained by subtracting the total quantity of network transmit PPS and the quantity of reserved network transmit PPS from the total quantity of available network transmit PPS.

A quantity of remaining available storage read MBPS is calculated based on the total quantity of available storage read MBPS and the total quantity of storage read MBPS of a computer, and may be equal to a value obtained by subtracting the total quantity of storage read MBPS from the total quantity of available storage read MBPS. Optionally, a quantity of reserved storage read MBPS may further be set for the computer 202, and a quantity of remaining available storage read MBPS is calculated based on the total quantity of available storage read MBPS, the total quantity of storage read MBPS, and the quantity of reserved storage read MBPS, and may be equal to a value obtained by subtracting the total quantity of storage read MBPS and the quantity of reserved storage read MBPS from the total quantity of available storage read MBPS.

A quantity of remaining available storage write MBPS is calculated based on the total quantity of available storage write MBPS and the total quantity of storage write MBPS of a computer, and may be equal to a value obtained by subtracting the total quantity of storage write MBPS from the total quantity of available storage write MBPS. Optionally, a quantity of reserved storage write MBPS may further be set for the computer 202, and a quantity of remaining available storage write MBPS is calculated based on the total quantity of available storage write MBPS, the total quantity of storage write MBPS, and the quantity of reserved storage write MBPS, and may be equal to a value obtained by subtracting the total quantity of storage write MBPS and the quantity of reserved storage write MBPS from the total quantity of available storage write MBPS.

A quantity of remaining available storage read IOPS is calculated based on the total quantity of available storage read IOPS and the total quantity of storage read IOPS of a computer, and may be equal to a value obtained by subtracting the total quantity of storage read IOPS from the total quantity of available storage read IOPS. Optionally, a quantity of reserved storage read IOPS may further be set for the computer 202, and a quantity of remaining available storage read IOPS is calculated based on the total quantity of available storage read IOPS, the total quantity of storage read IOPS, and the quantity of reserved storage read IOPS, and may be equal to a value obtained by subtracting the total quantity of storage read IOPS and the quantity of reserved storage read IOPS from the total quantity of available storage read IOPS.

A quantity of remaining available storage write IOPS is calculated based on the total quantity of available storage write IOPS and the total quantity of storage write IOPS of a computer, and may be equal to a value obtained by subtracting the total quantity of storage write IOPS from the total quantity of available storage write IOPS. Optionally, a quantity of reserved storage write IOPS may further be set for the computer 202, and a quantity of remaining available storage write IOPS is calculated based on the total quantity of available storage write IOPS, the total quantity of storage write IOPS, and the quantity of reserved storage write IOPS, and may be equal to a value obtained by subtracting the total quantity of storage write IOPS and the quantity of reserved storage write IOPS from the total quantity of available storage write IOPS.

When the parameters of the remaining physical resources of the computer are obtained, corresponding timestamps and computer identities IDs are recorded as parts of the parameters. A recording manner is, for example, a computer ID-a timestamp-a parameter type-a parameter.

3. A parameter of a compute instance-level physical resource

Different from the parameter of the computer-level physical resource, the parameter of the compute instance-level physical resource focuses on each parameter of a physical resource occupied by each compute instance on a computer in which the compute instance is located. Information of various occupied physical resources recorded in a host OS includes an ID of a compute instance. The quantity of network received bytes is used as an example. The host OS records a compute instance to which a destination of each string of network received bytes belongs. Therefore, the host OS may collect statistics on the network received bytes at each compute instance level.

CPU usage of a compute instance indicates usage of a vCPU, allocated to a compute instance. The usage of the vCPU is obtained by the scheduling agent 2022 in a sampling period, and is displayed as a percentage of a CPU usage frequency to a CPU primary frequency. When vCPUs are allocated to one compute instance, the CPU usage of the instance may be an average of usage of the plurality of vCPUs.

Memory usage of a compute instance indicates usage of a virtual memory device, allocated to a compute instance. The usage of the virtual memory device is obtained by the scheduling agent 2022 in a sampling period, and may be displayed by using a capacity of a used virtual memory in the sampling period, or may be displayed by using a ratio of a capacity of a virtual memory used by the compute instance to all virtual memories allocated to the compute instance in the sampling period.

A quantity of CPU completed instructions of a compute instance indicates a quantity of CPU instructions used to execute a compute instance by a CPU of a computer. The quantity of CPU instructions is obtained by the scheduling agent 2022 in a sampling period.

A quantity of CPU instruction unhalted clock cycles of a compute instance indicates a quantity of CPU clock cycles used in a process of executing a CPU instruction of a compute instance by a CPU of a computer. The quantity of CPU clock cycles is obtained by the scheduling agent 2022 in a sampling cycle, and is, for example, an average of CPU clock cycles for running a CPU instruction in the sampling period.

Local memory bandwidth occupation of a compute instance indicates a bandwidth of a local memory device, occupied in a process in which a computer performs compute instance memory access. The bandwidth of the local memory device is obtained by the scheduling agent 2022 in a sampling period.

Remote memory bandwidth occupation of a compute instance indicates a bandwidth of a remote memory device, occupied in a process in which a computer performs compute instance memory access. The bandwidth of the remote memory device is obtained by the scheduling agent 2022 in a sampling period.

Last level cache (LLC) usage of a compute instance indicates usage of an LLC occupied by a compute instance. The usage is obtained by the scheduling agent 2022 in a sampling period.

A last level cache miss rate of a compute instance indicates a miss rate of a compute instance failing to gain access to an LLC. The miss rate is obtained by the scheduling agent 2022 in a sampling period.

A CPU pipeline includes two parts: a frontend and a backend. A CPU in a frontend part obtains an instruction and decodes the instruction into one or more underlying hardware instructions referred to as micro-operations (uops). Then, a CPU in a backend part monitors when data required by the 8 tops is available, and executes the 8 tops in an available execution unit.

A quantity of CPU frontend stalled clock cycles of a compute instance indicates a quantity of clock cycles when a CPU instruction of a compute instance stalled at a frontend. The quantity of clock cycles is obtained by the scheduling agent 2022 in a sampling period.

A quantity of CPU backend stalled clock cycles of a compute instance indicates a quantity of clock cycles when a CPU instruction of a compute instance stalled at a backend. The quantity of clock cycles is obtained by the scheduling agent 2022 in a sampling period.

A quantity of network received bytes of a compute instance indicates a total size (in bytes) of data packets received by a virtual network device allocated to a compute instance. The total size of data packets is obtained by the scheduling agent 2022 in a sampling period.

A quantity of network received packets of a compute instance indicates a quantity of data packets received by a virtual network device allocated to a compute instance. The quantity of data packets is obtained by the scheduling agent 2022 in a sampling period.

A quantity of network transmit bytes of a computer instance indicates a total size (in bytes) of data packets transmitted by a virtual network device allocated to a compute instance. The total size of data packets is obtained by the scheduling agent 2022 in a sampling period.

A quantity of network transmit packets of a computer instance indicates a quantity of data packets transmitted by a virtual network device allocated to a compute instance. The quantity of data packets is obtained by the scheduling agent 2022 in a sampling period.

A quantity of storage reads of a compute instance indicates a quantity of read operations performed on a virtual storage device allocated to a compute instance. The quantity of read operations is obtained by the scheduling agent 2022 in a sampling period.

A quantity of storage writes of a compute instance indicates a quantity of write operations performed on a virtual storage device allocated to a compute instance. The quantity of write operations is obtained by the scheduling agent 2022 in a sampling period.

A quantity of storage read bytes of a compute instance indicates a size (in bytes) of data obtained by performing a read operation on a virtual storage device allocated to a compute instance. The size of data is obtained by the scheduling agent 2022 in a sampling period.

A quantity of storage write bytes of a compute instance indicate a size (in bytes) of data obtained by performing a write operation on a virtual storage device allocated to a compute instance. The size of the data is obtained by the scheduling agent 2022 in a sampling period.

A storage write latency of a compute instance indicates a write operation latency of a compute instance. The write operation latency is obtained by the scheduling agent 2022 in a sampling period.

A storage read latency of a compute instance indicates a read operation latency of a compute instance. The read operation latency is obtained by the scheduling agent 2022 in a sampling period.

Further, based on the parameter of the compute instance-level physical resource, the scheduling agent 2022 may obtain another parameter of the compute instance-level physical resource.

A quantity of storage read MBPS of a compute instance is calculated based on the quantity of storage read bytes of the compute instance and a sampling period, and may be equal to a value obtained by dividing the quantity of storage read bytes of the compute instance by (1024×1024× Sampling period).

A quantity of storage write MBPS of a compute instance is calculated based on the quantity of storage write bytes of the compute instance and a sampling period, and may be equal to a value obtained by dividing the quantity of storage write bytes of the compute instance by (1024×1024× Sampling period).

A quantity of storage read IOPS of a compute instance is calculated based on the quantity of storage reads of the compute instance and a sampling period, and may be equal to a value obtained by dividing the quantity of storage reads of the compute instance by the sampling period.

A quantity of storage write IOPS of a compute instance is calculated based on the quantity of storage writes of the compute instance and a sampling period, and may be equal to a value obtained by dividing the quantity of storage writes of the compute instance by the sampling period.

A network received bandwidth of a compute instance is calculated based on the quantity of network received bytes of the compute instance and a sampling period, and may be equal to a value obtained by dividing the quantity of network received bytes of the compute instance by (1024×1024× Sampling period).

A network transmit bandwidth of a compute instance is calculated based on the quantity of network transmit bytes of the computer instance and a sampling period, and may be equal to a value obtained by dividing the quantity of network transmit bytes of the compute instance by (1024×1024× Sampling period).

A quantity of network received PPS of a compute instance is calculated based on the quantity of network received packets of the compute instance and a sampling period, and may be equal to a value obtained by dividing the quantity of network received packets of the compute instance by the sampling period.

A quantity of network transmit PPS of a computer instance is calculated based on the quantity of network received packets of the compute instance and a sampling period, and may be equal to a value obtained by dividing the quantity of network received packets of the compute instance by the sampling period.

When the parameters of the compute instance-level physical resources are sampled, corresponding timestamps and compute instance IDs are recorded as a part of the parameters, to indicate usage of various physical resources of the computer on which the compute instance is located and that are occupied by the compute instance. A recording manner for the compute instance-level physical resource is, for example, a compute instance ID-a timestamp-a parameter type-a parameter.

Figure 3:
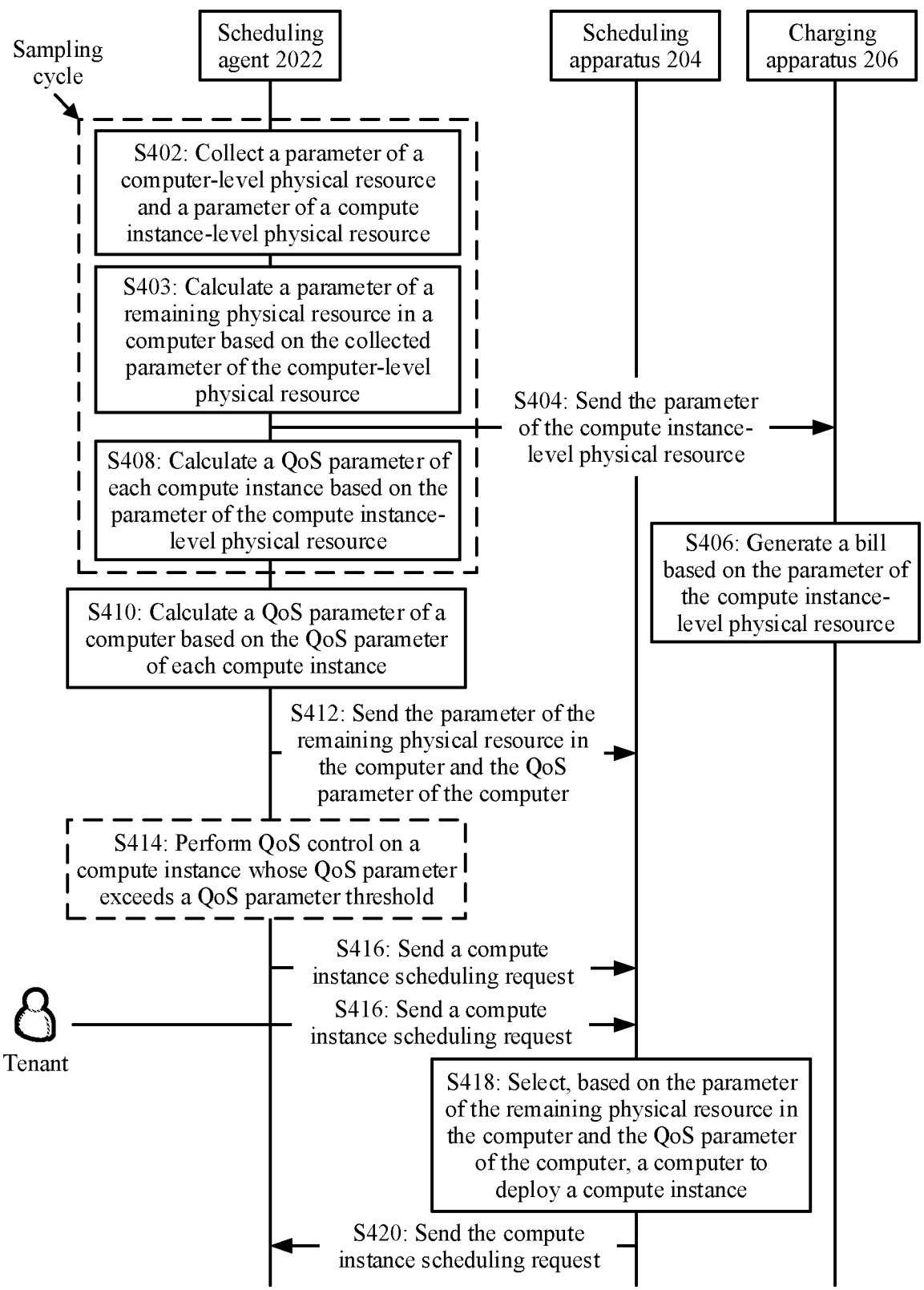
FIG. 3 is a schematic flowchart of a compute instance scheduling method.

FIG. 3 provides a compute instance scheduling method.

S402: A scheduling agent 2022 collects a parameter of a computer-level physical resource and a parameter of a compute instance-level physical resource.

The scheduling agent 2022 is deployed on each computer 202 of a compute instance provisioning system 200. Each scheduling agent 2022 periodically collects the parameter of the computer-level physical resource and the parameter of the compute instance-level physical resource in a computer to which the scheduling agent 2022 is located.

The scheduling agent 2022 may specifically collect any one or more of the parameters of the computer-level physical resources and any one or more of the parameters of the compute instance-level physical resources. Specifically, which parameter of the computer-level physical resource and which parameter of the compute instance-level physical resource are to be collected, refer to that which parameter of the computer-level physical resource and which parameter of the compute instance-level physical resource need to be used in a subsequent step to generate a bill and calculate a QoS parameter of each compute instance.

S403: The scheduling agent 2022 calculates a parameter of a remaining physical resource in the computer based on the collected parameter of the computer-level physical resource.

The scheduling agent 2022 may obtain any one or more of the parameters of the remaining physical resources in the computer.

The step S403 may be performed at any moment after the step S402 and before a step S412.

S404: The scheduling agent 2022 sends the parameter of the compute instance-level physical resource to a charging apparatus 206.

The scheduling agent 2022 may send, to the charging apparatus 206, some or all of the parameters of the compute instance-level physical resources that are collected in the step S402.

S406: The charging apparatus 206 generates the bill for a compute instance based on the parameter of the compute instance-level physical resource.

The bill includes a timestamp, a parameter of each compute instance-level physical resource, fees of each compute instance-level physical resource, and total fees. The charging apparatus 206 calculates the fees of each compute instance-level physical resource based on the parameter of each compute instance-level physical resource, and then calculates a sum of the fees of each compute instance-level physical resource as the total fees.

The charging apparatus 206 may generate the bill based on one or more of CPU usage of the compute instance, memory usage of the compute instance, the quantity of network received bytes of the compute instance, the quantity of network transmit bytes of the compute instance, the quantity of storage read bytes of the compute instance, and the quantity of storage write bytes of the compute instance.

The parameter that is of the compute instance-level physical resource and that is required for generating the bill is collected by the scheduling agent 2022 in the step S402, and is sent to the charging apparatus 206 in the step S404.

Compared with an existing charging mode in which charging is performed based on use duration of the physical resource, a charging mode proposed in the method, in which charging is performed based on usage of an actual compute instance resource through calculation improves charging precision.

The step S404 and the step S406 may be performed in parallel with subsequent steps S408 to S420.

S408: The scheduling agent 2022 calculates a QoS parameter of each compute instance based on the parameter of the compute instance-level physical resource.

The scheduling agent 2022 calculates the QoS parameter of each compute instance based on the one or more of the parameters that are of the compute instance-level physical resource and that are collected in the step S402. A QoS parameter of a compute instance reflects QoS of the compute instance. For example, in the following description, a higher QoS parameter indicates greater impact on the QoS of the compute instance. Actually, the higher QoS parameter may also indicate smaller impact on the QoS of the compute instance.

After many experiments and tests, an applicant obtains a calculation manner of the QoS parameter of the compute instance. The QoS parameter of the compute instance calculated in the calculation manner can better reflect a QoS change of the compute instance.

The QoS parameter of the compute instance is equal to f1 (the CPU usage of the compute instance, a quantity of CPU completed instructions of the compute instance, a quantity of CPU instruction unhalted clock cycles of the compute instance, a quantity of CPU frontend stalled clock cycles of the compute instance, and a quantity of CPU backend stalled clock cycles of the compute instance). f1 ( ) is a function or calculation model.

The step S402 and the step S408 are cyclically performed in each sampling period.

S410: The scheduling agent 2022 calculates a QoS parameter of a computer based on the QoS parameter of each compute instance.

The scheduling agent 2022 calculates, based on the QoS parameter of each compute instance, calculated in the step S408, the QoS parameter of the computer on which the scheduling agent 2022 is located. The scheduling agent 2022 may calculate, based on the QoS parameter of each compute instance, obtained in one or more sampling periods, the QoS parameter of the computer on which the scheduling agent 2022 is located. The QoS parameter of the computer reflects an overall QoS of the compute instance running on the computer. For example, in the following description, a higher QoS parameter indicates greater impact on the overall QoS of the compute instance running on the computer. Actually, the higher QoS parameter may also indicate smaller impact on the overall QoS of the compute instance running on the computer.

There are n compute instances running on the computer on which the scheduling agent 2022 is located, and S(i) is an average value of QoS parameters of an $i^{th}$ compute instance in latest x sampling periods, where i≥1 and i≤n, and x is an integer greater than 0. T(i) is a preset QoS parameter threshold of the $i^{th}$ compute instance. The QoS parameter thresholds of compute instances may be the same or may be different. The QoS parameter of the computer includes one or more of the following: max{S(1)-T(1), ..., S(n)-T(n)} and avg{S(1)-T(1), ..., S(n)-T(n)}, where max{ } is a function for obtaining a maximum value, and avg{ } is a function for obtaining an average value.

Alternatively, the QoS parameter of the computer is calculated only by using a high-priority compute instance. There are m compute instances running on the computer on which the scheduling agent 2022 is located, including n high-priority compute instances, and S(i) is an average value of QoS parameters of an $i^{th}$ high-priority compute instance in latest x sampling periods, where i≥1 and i≤n, and x is an integer greater than 0. T(i) is a preset QoS parameter threshold of the $i^{th}$ high-priority compute instance. The QoS parameter thresholds of the m compute instances may be the same or may be different. The QoS parameter of the computer includes one or more of the following: max{S(1)-T(1), ..., S(n)-T(n)} and avg{S(1)-T(1), ..., S(n)-T(n)}.

The scheduling agent 2022 may also use another function to calculate the QoS parameter of each compute instance, to obtain the QoS parameter of the computer.

S412: The scheduling agent 2022 sends the parameter of the remaining physical resource in the computer and the QoS parameter of the computer to a scheduling apparatus 204.

Because the parameter of the remaining physical resource in the computer is obtained in the step S403, the step S412 may also be performed in two steps. The parameter of the remaining physical resource in the computer is sent to the scheduling apparatus 204 at any moment after the step S403, and the QoS parameter of the computer is sent to the scheduling apparatus 204 at any moment after the step S410.

S414: The scheduling agent 2022 performs QoS control on the compute instance whose QoS parameter exceeds the QoS parameter threshold.

The step 414 may be performed at any moment after the step S408. In the step S408, the scheduling agent 2022 obtains the QoS parameter of each compute instance. The scheduling agent 2022 determines whether the QoS parameter of each compute instance exceeds the QoS parameter threshold, and performs the QoS control on the compute instance whose QoS parameter exceeds the QoS parameter threshold. A QoS control means include isolating one or more physical resources for exclusive use by the compute instance whose QoS parameter exceeds the QoS parameter threshold, and/or scheduling another local compute instance.

Physical resources that can be isolated include one or more of the following: a memory device, a CPU core, an LLC, and a memory bandwidth.

That the scheduling agent 2022 schedules the another local compute instance includes disabling the another local compute instance (a low-priority compute instance may be disabled), and/or generating a compute instance scheduling request (case 1 in a step S416). The compute instance scheduling request is used to request to migrate the another local compute instance. A migrated local compute instance is determined, based on priorities of the local compute instances and/or interference coefficient of each local compute instance.

The interference coefficient of each local compute instance is obtained based on a parameter of a compute instance-level physical resource. For example, the interference coefficient of each local compute instance is equal to f2 (local memory bandwidth occupation of the compute instance, remote memory bandwidth occupation of the compute instance, a last level cache miss rate of the compute instance, a network received bandwidth of the compute instance, a quantity of network received PPS of the compute instance, a network transmit bandwidth of the compute instance, a quantity of network transmit PPS of the compute instance, a quantity of storage write MBPS of the compute instance, a quantity of storage write MBPS of the compute instance, a quantity of storage read IOPS of the compute instance, a quantity of storage write IOPS of the compute instance, a storage write latency of the compute instance, and a storage write latency of the compute instance). f2( ) is a function or calculation model.

After the QoS control is performed on the compute instance whose QoS parameter exceeds the QoS parameter threshold, if the QoS parameter of the compute instance still exceeds the QoS threshold, a compute instance scheduling request (case 2 in the step S416) is generated. The compute instance scheduling request is used to request to migrate the compute instance that exceeds the QoS threshold.

In the step S414, performing the QoS control on the compute instance whose QoS parameter exceeds the QoS parameter threshold is an optional step. In other words, after the step S408, if the scheduling agent 202 determines that a QoS parameter of a compute instance exceeds the QoS parameter threshold, the compute instance scheduling request may be directly generated, to request to migrate the compute instance whose QoS parameter exceeds the QoS parameter threshold.

S416: The scheduling agent 2022 or a client of a tenant sends the compute instance scheduling request to the scheduling apparatus 204.

The step S416 occurs in three cases, and the case 1 and the case 2 are described in the step S414. A case 3 is that the tenant sends the compute instance scheduling request to the scheduling apparatus 204 by using the client (or a compute instance of the tenant automatically sends the compute instance scheduling request to the scheduling apparatus 204 based on a service). The compute instance scheduling request is used to request to create a compute instance or migrate an existing compute instance.

The compute instance scheduling request in the step S416 carries a physical resource requirement required by the to-be-created or to-be-migrated compute instance. The physical resource requirement includes any one or more of the following: a quantity of required cores in a CPU, a required memory capacity, a required network received bandwidth, a required network transmit bandwidth, a quantity of required network received PPS, a quantity of required network transmit PPS, a quantity of required storage read MBPS, a quantity of required storage write MBPS, a quantity of required storage read IOPS, a quantity of required storage write IOPS, a to-be-excluded computer ID.

Scheduling agents 2022 running on each computer 202 in the compute instance provisioning system 200 perform steps S402 to S404, and steps S408 to S416.

S418: The scheduling apparatus 204 selects, based on the parameter of the remaining physical resource in the computer and the QoS parameter of the computer, a computer to deploy the compute instance.

If a physical resource requirement includes a computer ID that needs to be excluded, the scheduling apparatus 204 first excludes, in subsequent filtering, a computer corresponding to the computer ID that needs to be excluded in the compute instance provisioning system 200, to obtain a candidate computer list. A computer that sends the compute instance scheduling request may also be excluded from the candidate computer list, to avoid that the to-be-migrated compute instance is redeployed to the original computer when the compute instance scheduling request is used to migrate an existing compute instance.

Then, the scheduling apparatus 204 determines, based on various required physical resources included in the physical resource requirement and a parameter of a remaining physical resource of each computer 202 in the candidate computer list, a computer 202 whose remaining physical resource can meet the physical resource requirement.

In other words, the scheduling apparatus 204 determines whether the parameter of the remaining physical resource of each computer 202 in the candidate computer list is greater than the required physical resource included in the physical resource requirement. When there are required physical resources included in the physical resource requirement, the parameter of each remaining physical resource in the computer 202 is usually required to be greater than a corresponding required physical resource.

Further, in the computer 202 whose remaining physical resource can meet the physical resource requirement, the scheduling apparatus 204 selects, based on the QoS parameter of each computer 202, a computer 202 configured to deploy the compute instance.

If the higher QoS parameter of the computer indicates the greater impact on the overall QoS of the compute instance running on the computer, the scheduling apparatus 204 selects, from the computer 202 whose remaining physical resource can meet the physical resource requirement, the computer 202 whose QoS parameter is the smallest to deploy the compute instance. If the higher QoS parameter of the computer indicates the smaller impact on the overall QoS of the compute instance running on the computer, the scheduling apparatus 204 selects, from the computer 202 whose remaining physical resource can meet the physical resource requirement, the computer 202 whose QoS parameter is the largest to deploy the compute instance.

S420: The scheduling apparatus 204 sends a compute instance scheduling command to the scheduling agent 2022 running on the selected computer 202.

The scheduling apparatus 204 generates the compute instance scheduling command based on a selection result in the step S418. The compute instance scheduling command usually includes information such as a compute instance ID and the physical resource requirement required by the compute instance.

The scheduling agent 2022 running on the selected computer 202 creates a compute instance on the selected computer 202 according to the compute instance scheduling command.

In the compute instance scheduling method provided above, the QoS parameter of the compute instance is obtained based on the parameter of the compute instance-level physical resource, and the QoS parameter of the computer is obtained based on the parameter of the computer-level physical resource. The QoS parameter of the compute instance helps identify the compute instance that needs to be migrated or controlled. The QoS parameter of the computer helps select the computer to deploy the compute instance. According to the method, utilization of the physical resource of the computer 202 in the compute instance provisioning system 200 is higher. The QoS of the compute instance is ensured. Precision of scheduling the compute instance is greatly improved, and the utilization of the resource of the computer in the compute instance provisioning system 200 is greatly improved.

In FIG. 3, the scheduling agent 2022 calculates the QoS parameter of the computer. This may increase a calculation burden on each computer 202. As a result, physical resources that can be provided by the computer 202 for the compute instance are reduced, and the QoS of the compute instance is affected. Therefore, this disclosure further provides a compute instance scheduling method shown in FIG. 4A and FIG. 4B.

Steps S402 to S408 and steps after a step S410 are similar to the method provided in FIG. 3.

After a step S408, a scheduling agent 2022 sends a QoS parameter value of each compute instance to a scheduling apparatus 204, and the scheduling apparatus 204 performs the step S410. In this case, only a parameter of a remaining physical resource in a computer needs to be sent in a step S412.

According to the compute instance scheduling method provided above, a calculation burden on a QoS parameter of the computer is further transferred to the scheduling apparatus 204. This reduces consumption of a physical resource of the computer 202, and improves QoS of a compute instance running on the computer 202.

Figure 4A:
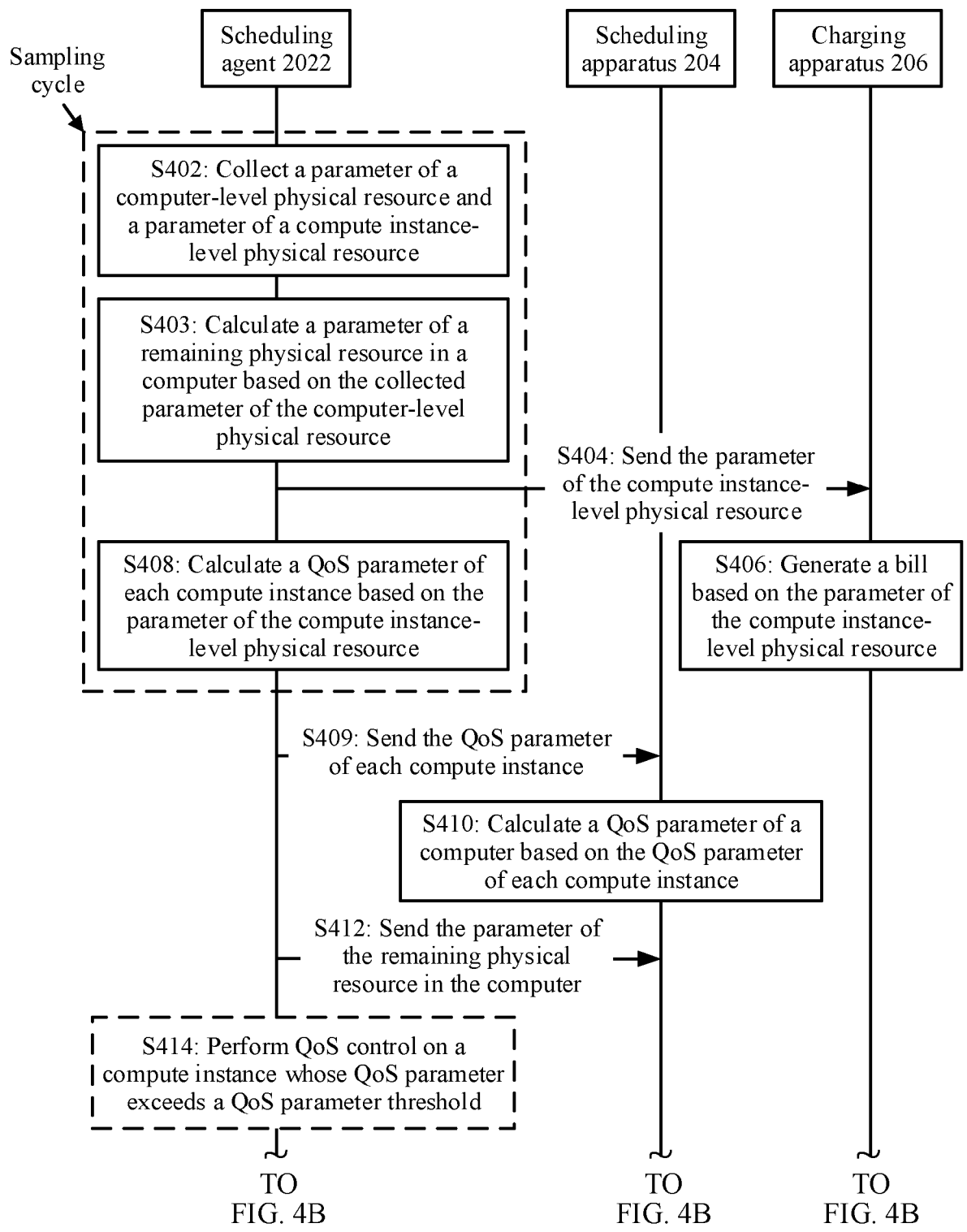
FIG. 4A and FIG. 4B are a schematic flowchart of another compute instance scheduling method.
Figure 4B:
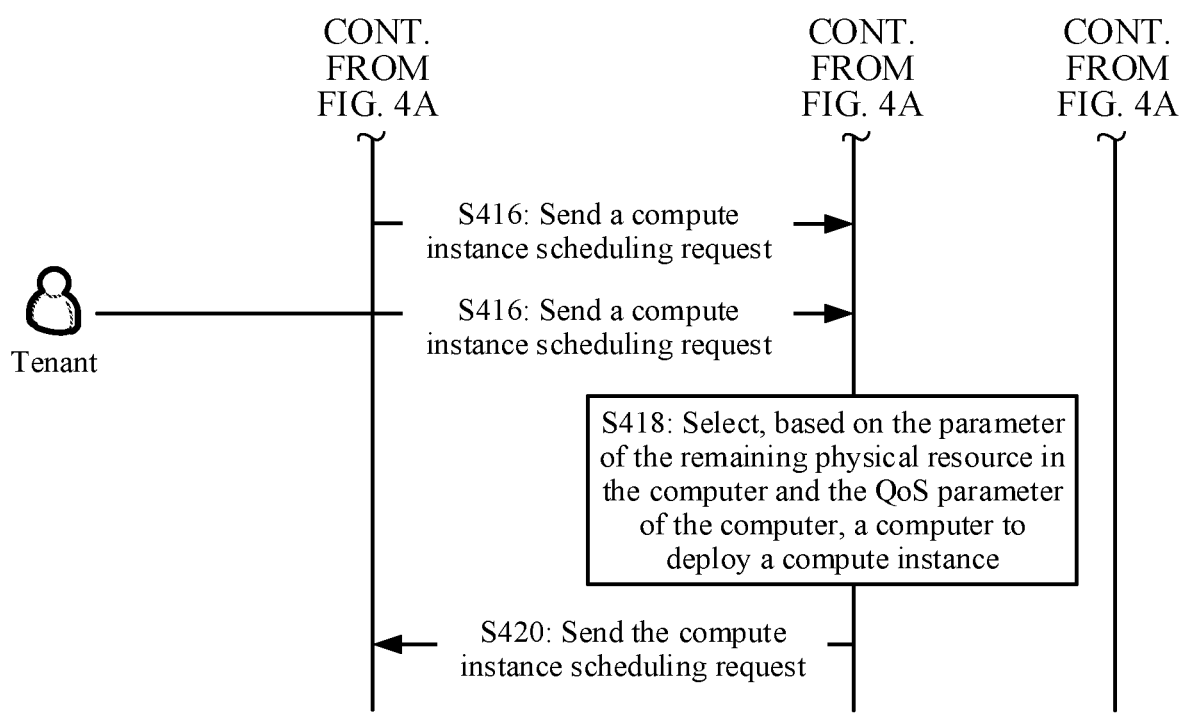
Figure 5A:
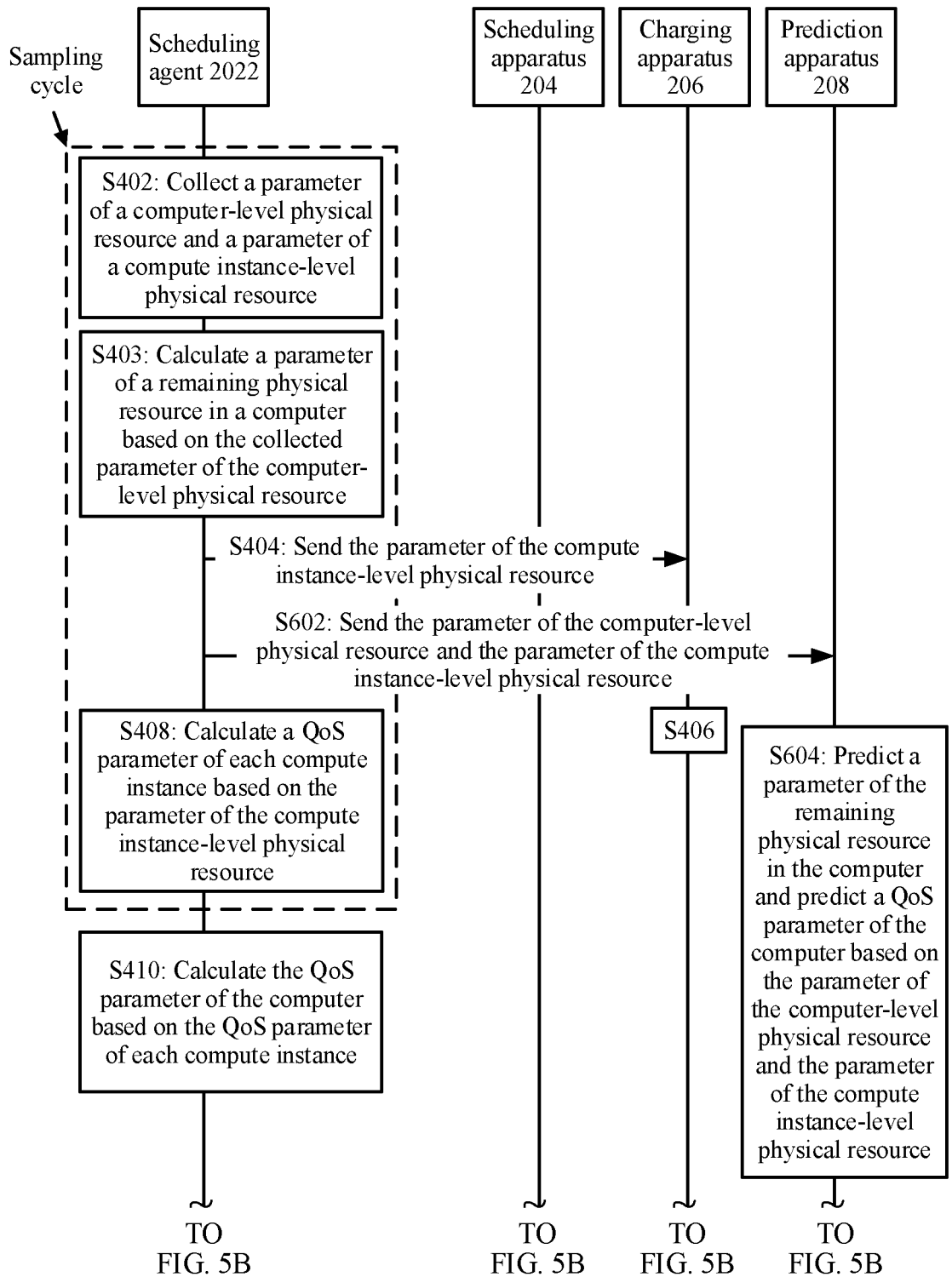
FIG. 5A and FIG. 5B are a schematic flowchart of another compute instance scheduling method.
Figure 5B:
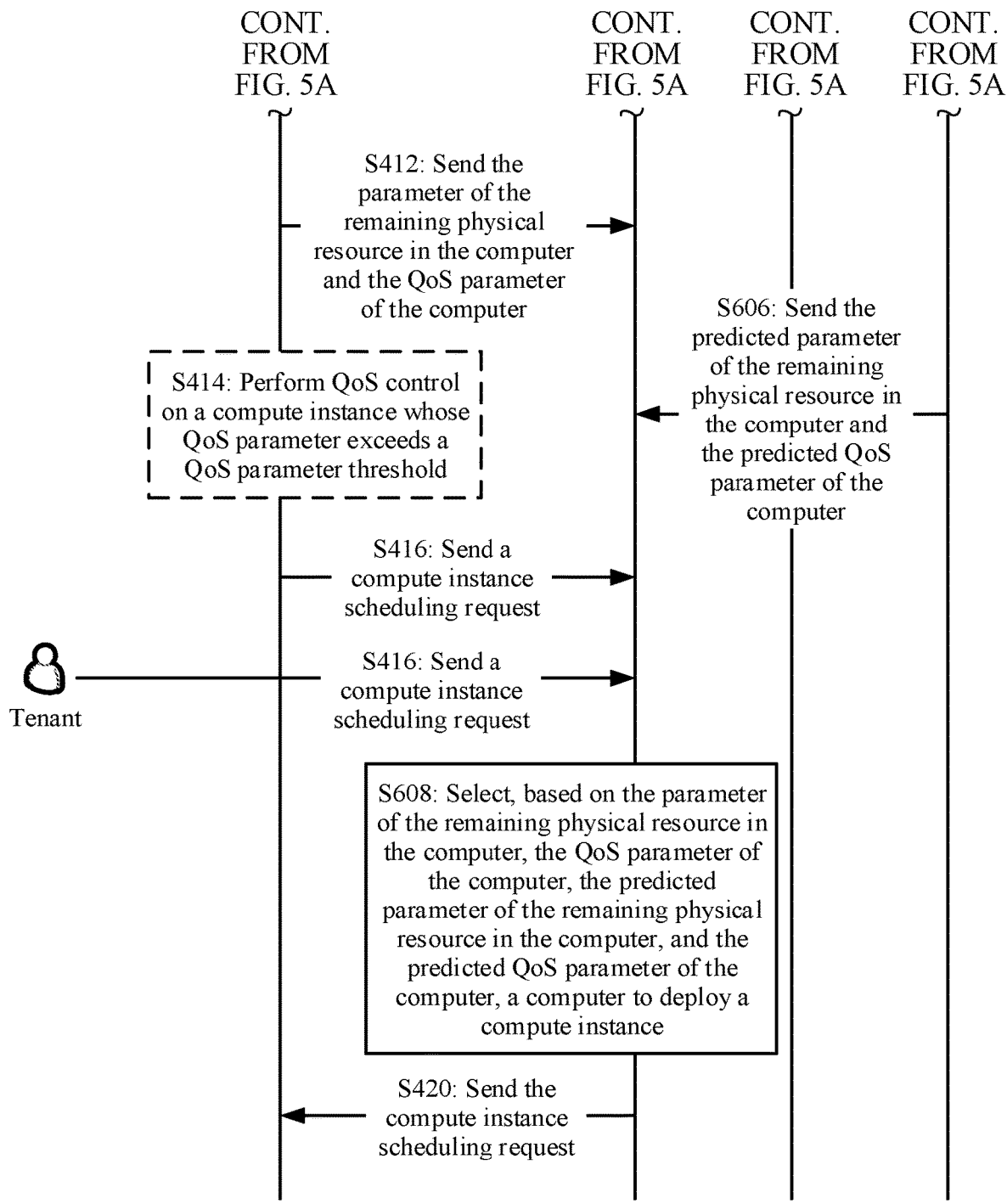

Based on FIG. 3 and FIG. 4A and FIG. 4B, this disclosure further provides a compute instance scheduling method shown in FIG. 5A and FIG. 5B.

Similar to FIG. 4A and FIG. 4B, calculation of a QoS parameter of a compute instance in a step S408 may also be transferred to a scheduling apparatus 204. After the step S408, a scheduling agent 2022 sends a parameter of a compute instance-level physical resource to the scheduling apparatus 204, and the scheduling apparatus 204 performs the step S408. This further reduces consumption of a physical resource of a computer 202, and improves QoS of a compute instance running on the computer 202.

In the method shown in FIG. 5A and FIG. 5B, after a step S402, the scheduling agent 2022 performs a step S602 of sending a parameter of a computer-level physical resource and the parameter of the compute instance-level physical resource to a prediction apparatus 208.

After a plurality of sampling periods, namely, after the step S602 is performed for a plurality of times, the prediction apparatus 208 performs a step S604.

S604: The prediction apparatus 208 predicts a parameter of a remaining physical resource in the computer and/or predicts a QoS parameter of the computer based on the parameter of the computer-level physical resource, obtained in the plurality of sampling periods and the parameter of the compute instance-level physical resource, obtained in the plurality of sampling periods. The predicted parameter of the remaining physical resource in the computer indicates a parameter of the remaining physical resource in the computer in a future time period. The predicted QoS parameter of the computer indicates a QoS parameter of the computer in the future time period.

In another scenario, a step S602 is performed after the step S408. In the step S602, the scheduling agent 2022 sends a parameter of a computer-level physical resource and the QoS parameter of the compute instance to a prediction apparatus 208. In a step S604, the prediction apparatus 208 predicts a QoS parameter of the computer based on the QoS parameter of the compute instance, obtained in the plurality of sampling periods, and predicts a parameter of a remaining physical resource in the computer based on the parameter of the computer-level physical resource, obtained in the plurality of sampling periods.

In another scenario, a step S602 is performed after a step S410. In the step S602, the scheduling agent 2022 sends a parameter of a computer-level physical resource and a QoS parameter of the computer to a prediction apparatus 208. In a step S604, the prediction apparatus 208 predicts a QoS parameter of the computer based on the QoS parameter of the computer, obtained in the plurality of sampling periods, and predicts a parameter of a remaining physical resource in the computer based on the parameter of the computer-level physical resource, obtained in the plurality of sampling periods.

S606: The prediction apparatus 208 sends the predicted parameter of the remaining physical resource in the computer and/or the predicted QoS parameter of the computer to the scheduling apparatus 204.

S608 (replacing the step S418 in FIG. 3 and FIG. 4B): A scheduling apparatus 204 selects, based on a parameter of a remaining physical resource in the computer, a QoS parameter of the computer, and the predicted parameter of the remaining physical resource in the computer and/or the predicted QoS parameter of the computer, a computer to deploy a compute instance.

For other steps in FIG. 5A and FIG. 5B, refer to FIG. 3. The method corresponding to FIG. 5A and FIG. 5B may also be similar to that in FIG. 4A and FIG. 4B in which the scheduling apparatus 204 calculates the QoS parameter of the computer. Details are not described herein again.

In the compute instance scheduling method provided above, the prediction apparatus is used to predict the remaining physical resource and the QoS parameter of the computer, so that when selecting the computer to deploy the compute instance, the scheduling apparatus 204 can consider a future running status of each computer. This further improves precision of scheduling a compute instance and utilization of a resource in the computer in the compute instance provisioning system 200.

FIG. 2 provides a scheduling agent 2022. The scheduling agent 2022 includes a communications module 2023, a collection module 2024, and a QoS parameter calculation module 2026. The scheduling agent 2022 further includes a control module 2028.

In the scheduling agent 2022 in the method provided in FIG. 3, the communications module 2022 is configured to perform the steps S404, S412, and S416 (the case 1 and the case 2) and receive the compute instance scheduling command in the step S420. The collection module 2024 is configured to perform the step S402. The QoS parameter calculation module 2026 is configured to perform the steps S403, S408, and S410. The control module 2028 is configured to perform the step S414 and execute the compute instance scheduling command received in the step S420.

In the scheduling agent 2022 in the method provided in FIG. 4A and FIG. 4B, the communications module 2022 is configured to perform the steps S404, S409, S412, and S416 (the case 1 and the case 2) and receive the compute instance scheduling command in the step S420. The collection module 2024 is configured to perform the step S402. The QoS parameter calculation module 2026 is configured to perform the steps S403 and S408. The control module 2028 is configured to perform the step S414 and execute the compute instance scheduling command received in the step S420.

When calculation of the QoS parameter of the compute instance in the step S408 may also be transferred to the scheduling apparatus 204, the communications module 2022 sends the parameter of the compute instance-level physical resource to the scheduling apparatus 204. The QoS parameter calculation module 2026 does not perform the step S408.

Figure 6:
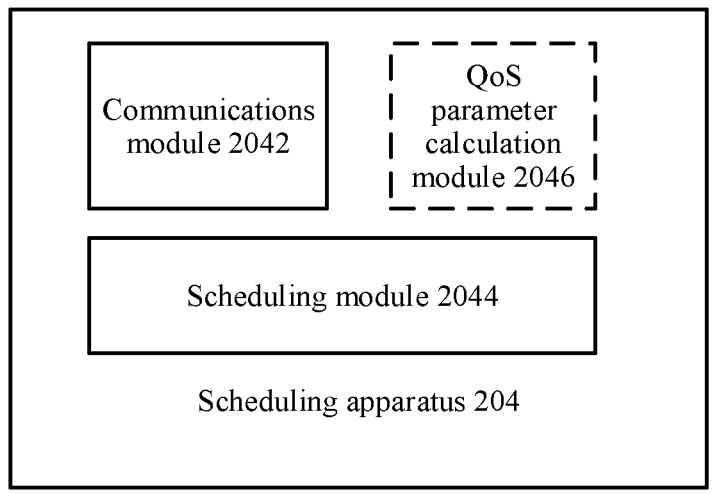
FIG. 6 is a schematic diagram of a structure of a scheduling apparatus.

FIG. 6 provides a scheduling apparatus 204, including a communications module 2042 and a scheduling module 2044. Optionally, the scheduling apparatus 204 further includes a QoS parameter calculation module 2046.

In the scheduling apparatus 204 in the method provided in FIG. 3, the communications module 2042 is configured to receive the parameter of the remaining physical resource in the computer and the QoS parameter of the computer that are sent in the step S412, and the compute instance scheduling request sent in the step S416, and perform the step S420. The scheduling module 2044 is configured to perform the step S418.

The scheduling apparatus 204 in the method provided in FIG. 4A and FIG. 4B further includes the QoS parameter calculation module 2046. The communications module 2042 is configured to receive the QoS parameter of each compute instance, sent in the step S409, the parameter of the remaining physical resource in the computer and the QoS parameter of the computer that are sent in the step S412, and the compute instance scheduling request in the S416, and perform the step S420. The scheduling module 2044 is configured to perform the step S418. The QoS parameter calculation module 2046 is configured to perform the step S410.

In the scheduling apparatus 204 in the method provided in FIG. 5A and FIG. 5B, the communications module 2042 is further configured to receive the predicted parameter of the remaining physical resource in the computer and/or the predicted QoS parameter of the computer that are/is sent in the step S606. The scheduling module 2044 is configured to perform the step S608.

Figure 7:
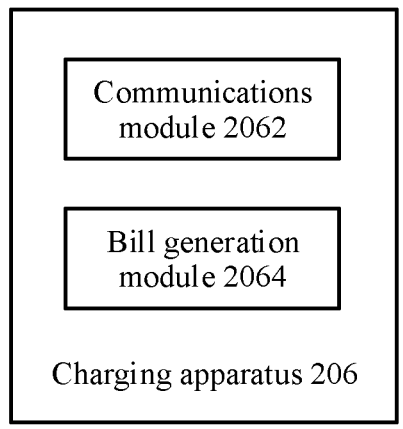
FIG. 7 is a schematic diagram of a structure of a charging apparatus.

FIG. 7 provides a charging apparatus 206, including a communications module 2062 and a bill generation module 2064. The communications module 2062 is configured to receive the parameter of the compute instance-level physical resource, sent in the step S404. The bill generation module 2064 is configured to perform the step S406.

Figure 8:
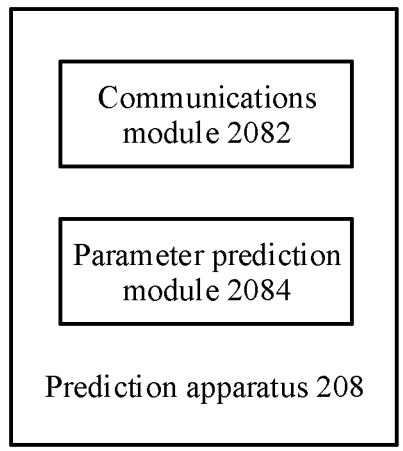
FIG. 8 is a schematic diagram of a structure of a prediction apparatus.

FIG. 8 provides a prediction apparatus 208, including a communications module 2082 and a parameter prediction module 2084. The communications module 2082 is configured to receive a parameter of a computer-level physical resource and the parameter of the compute instance-level physical resource that are sent in the step S602, and perform the step S606. The parameter prediction module 2084 is configured to perform the step S604.

The apparatuses and modules provided above may be software modules. In other words, the apparatuses and modules may be implemented by using a computer-executable instruction.

Figure 9:
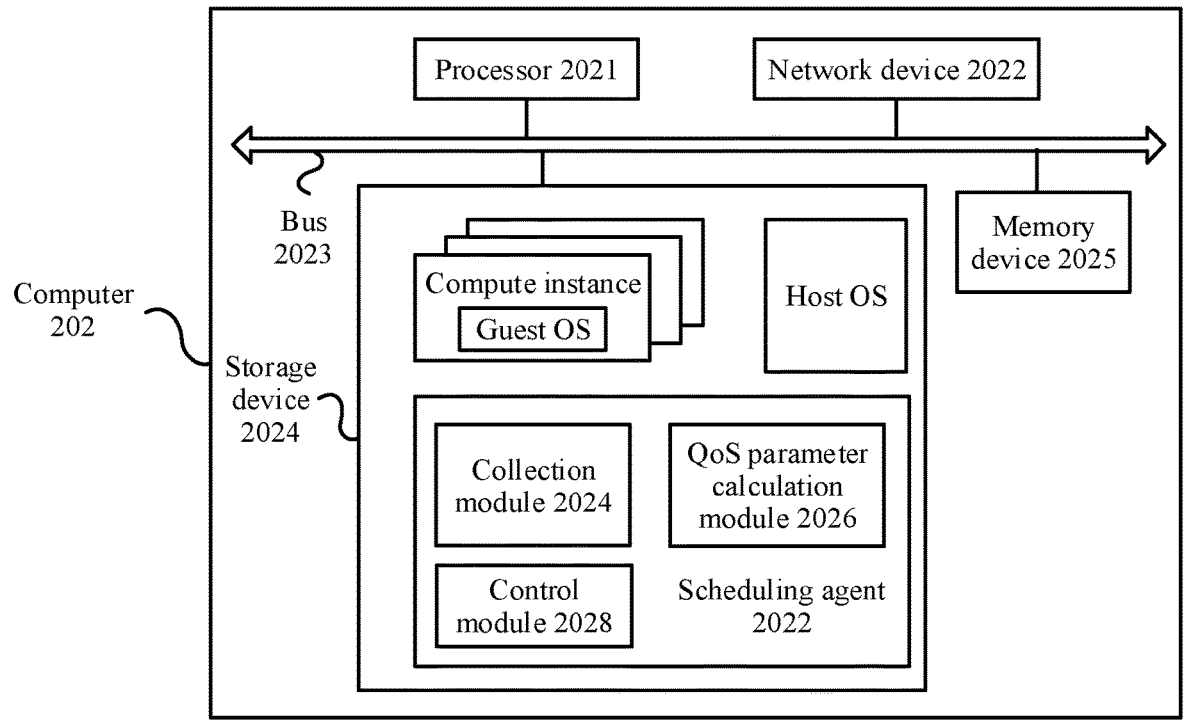
FIG. 9 is a schematic diagram of a structure of another computer.

FIG. 9 provides a computer 202. The computer 202 includes a bus 2023, a processor 2021, a network device 2022, a storage device 2024, a memory device 2025, and a cache device (not shown in the figure). The processor 2021, the network device 2022, the storage device 2024, and the memory device 2025 communicate with each other through the bus 2023. The network device 2022 is configured to communicate with the outside, and undertake a function of a communications module 2023.

The processor 2021 may be a CPU. The memory device 2025 may include a volatile memory device, for example, a random-access memory (RAM). The storage device 2024 may further be a nonvolatile memory device, for example, a read-only memory (ROM), a flash storage device, an HDD, or an SSD.

The storage device 2024 stores an executable instruction. The processor 2021 executes the executable instruction to perform a part performed by the scheduling agent 2022 in the methods provided in FIG. 3 to FIG. 5B. Specifically, the storage device 2024 stores an executable instruction to run at least one compute instance (for example, the compute instance is a VM), the collection module 2024, the QoS parameter calculation module 2026, and the control module 2028. The storage device 2024 may further include an executable instruction for running a host OS of the computer 202. The OS may be Linux™, Unix™, Windows™, or the like. For example, in FIG. 9, executable instructions for running at least one compute instance, a scheduling agent 2022, a guest OS, and the host OS are shown in the storage device 2024, and represent a non-operating state of the computer 202 provided in FIG. 9. When the computer 202 provided in FIG. 9 is in an operating state, the executable instructions for running the at least one compute instance, the scheduling agent 2022, the guest OS and the host OS is run in the memory device 2025.

Figure 10:
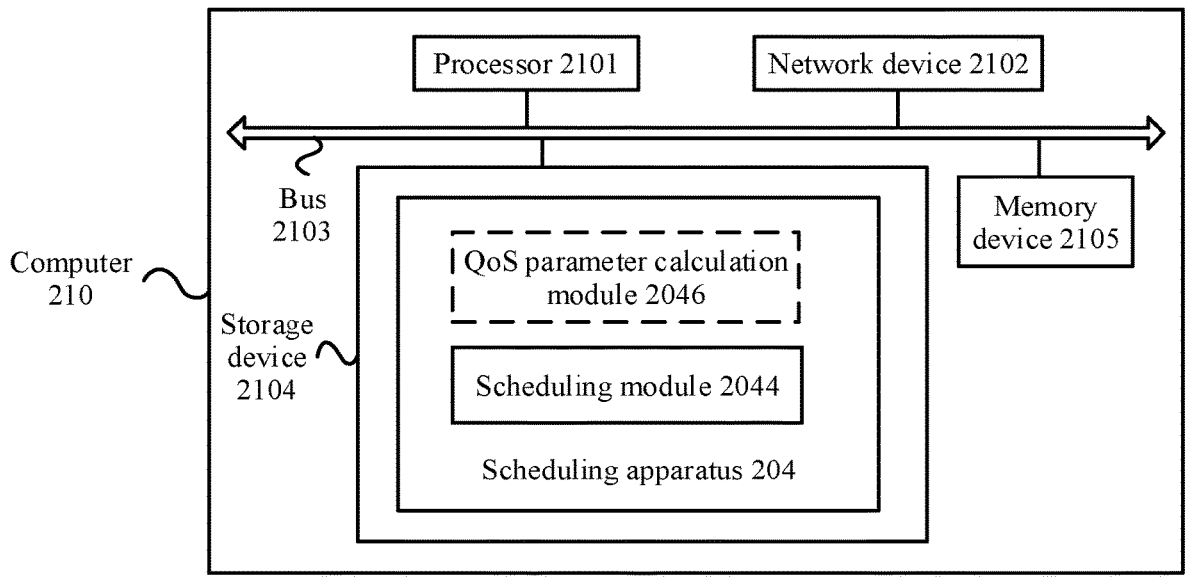
FIG. 10 is a schematic diagram of a structure of another computer.
Figure 11:
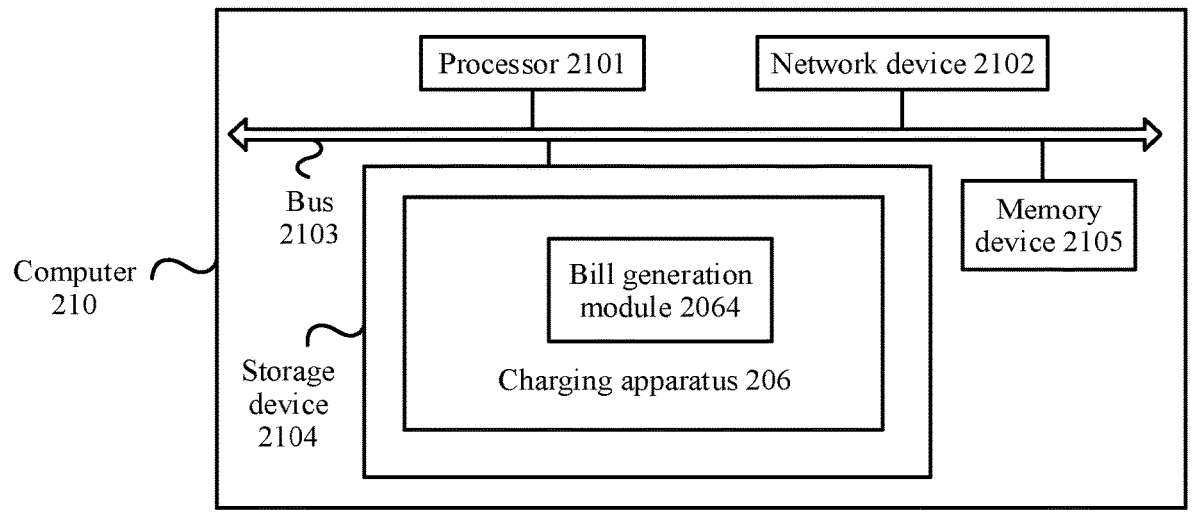
FIG. 11 is a schematic diagram of a structure of another computer.
Figure 12:
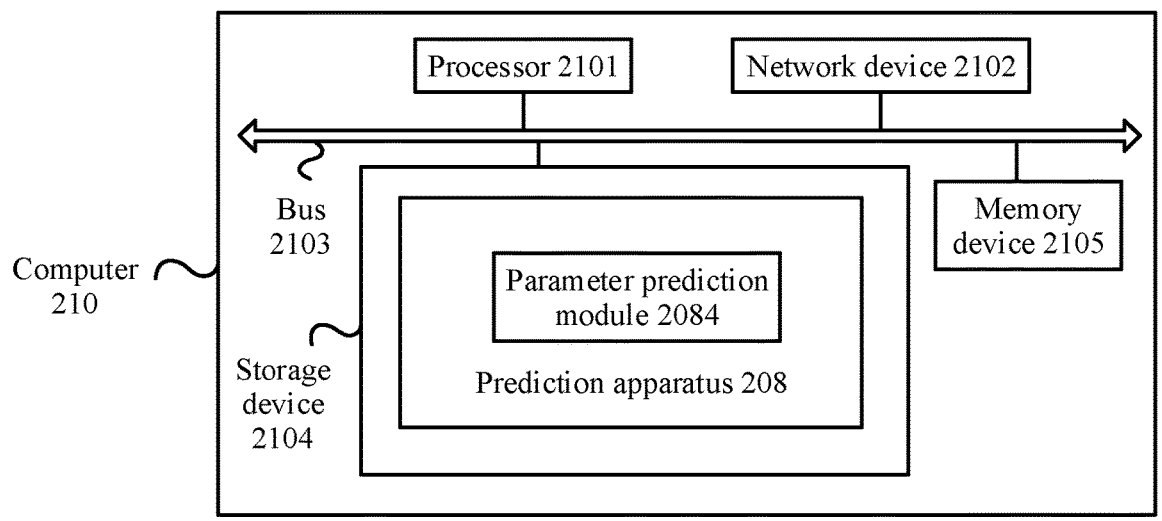
FIG. 12 is a schematic diagram of a structure of another computer.

FIG. 10 to FIG. 12 provide a computer 210 that runs on a management plane. The computer 210 includes a bus 2103, a processor 2101, a network device 2102, a storage device 2104, and a memory device 2105. The processor 2101, the network device 2102, the storage device 2104, and the memory device 2105 communicate with each other through the bus 2103. The network device 2102 is configured to communicate with the outside, and undertake a function of a communications module 2042.

The processor 2101 may be a CPU. The memory device 2105 may include a volatile storage device, for example, a RAM. The storage device 2104 may further be a nonvolatile storage device, for example, a ROM, a flash storage device, an HDD, or an SSD.

The storage device 2104 stores an executable instruction. The processor 2101 executes the executable instruction to perform a part performed by the scheduling apparatus 204 in the methods provided in FIG. 3 to FIG. 5B. Specifically, the storage device 2104 stores an executable instruction, to run the scheduling module 2044 and the QoS parameter calculation module 2046 (optional). The storage device 2104 may further include an executable instruction for running an OS. The OS may be Linux™, Unix™, Windows™, or the like. For example, in FIG. 10, an executable instruction for running the scheduling apparatus 204 is shown in the storage device 2104, and represents a non-operating state of the computer 210 provided in FIG. 10. When the computer 210 provided in FIG. 10 is in an operating state, the executable instruction for running the scheduling apparatus 204 is run in the memory device 2105.

A structure of the computer 210 provided in FIG. 11 is similar to that in FIG. 10. A network device 2102 is configured to communicate with the outside, and undertake a function of a communications module 2062. A storage device 2104 stores an executable instruction. A processor 2101 executes the executable instruction to perform a part performed by the charging apparatus 206 in the methods provided in FIG. 3 to FIG. 5B. Specifically, the storage device 2104 stores an executable instruction, to run the bill generation module 2064. The storage device 2104 may further include an executable instruction for running an OS. The OS may be Linux™, Unix™, Windows™, or the like. For example, in FIG. 11, an executable instruction for running the charging apparatus 206 is shown in the storage device 2104, and represents a non-operating state of the computer 210 provided in FIG. 11. When the computer 210 provided in FIG. 11 is in an operating state, the executable instruction for running the charging apparatus 206 is run in a memory device 2105.

A structure of the computer 210 provided in FIG. 12 is similar to that in FIG. 10. A network device 2102 is configured to communicate with the outside, and undertake a function of a communications module 2082. A storage device 2104 stores an executable instruction. A processor 2101 executes the executable instruction to perform a part performed by the prediction apparatus 208 in the methods provided in FIG. 5A and FIG. 5B. Specifically, the storage device 2104 stores an executable instruction, to run the parameter prediction module 2084. The storage device 2104 may further include an executable instruction for running an OS. The OS may be Linux™, Unix™, Windows™, or the like. For example, in FIG. 12, an executable instruction for running the prediction apparatus 208 is shown in the storage device 2104, and represents a non-operating state of the computer 210 provided in FIG. 12. When the computer 210 provided in FIG. 12 is in an operating state, the executable instruction for running the prediction apparatus 208 is run in a memory device 2105.

This disclosure further provides a computer cluster running a management plane, including at least one computer 210 connected through a communications network. For a structure of each computer 210, refer to FIG. 10. One or more of the scheduling apparatus 204, the charging apparatus 206, and the prediction apparatus 208 run on each computer 210. If calculation burdens of the scheduling apparatus 204, the charging apparatus 206, and the prediction apparatus 208 are light, the one or more of the scheduling apparatus 204, the charging apparatus 206, and the prediction apparatus 208 may be deployed on a same computer 210 to save costs.

A description of a procedure corresponding to each of the accompanying drawings has a focus. For a part that is not described in detail in a procedure, refer to a related description of another procedure.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital tenant line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, an SSD).

What is claimed is:

1. A method implemented by a compute instance provisioning system and comprising:
collecting a first usage of a first physical resource comprised in a first computer in the compute instance provisioning system, wherein the first computer is a physical component;
collecting a second usage of a second physical resource occupied by a first compute instance running on the first computer, wherein the first compute instance is a virtual component;
calculating a remaining physical resource parameter in the first computer based on the first usage;
calculating a first quality of service (QoS) parameter of the first compute instance based on the second usage;
calculating a second QoS parameter of the first computer based on the first QoS parameter; and
migrating the first compute instance or creating a second compute instance in the compute instance provisioning system based on the first usage, the second usage, the remaining physical resource parameter, and the second QoS parameter.

2. The method of claim 1, further comprising:
obtaining a compute instance scheduling request instructing migration of the first compute instance or creation of the second compute instance;
selecting, based on the remaining physical resource parameter and the second QoS parameter, a second computer in the compute instance provisioning system that can deploy the first compute instance or the second compute instance; and
deploying the first compute instance or the second compute instance on the second computer.

3. The method of claim 1, further comprising:
determining a second compute instance in the compute instance provisioning system whose third QoS parameter exceeds a QoS parameter threshold; and
performing QoS control on the second compute instance by:
isolating a third physical resource in a second computer on which the second compute instance is located for exclusive use by the second compute instance, or
scheduling a third compute instance running on the second computer.

4. The method of claim 3, wherein the third physical resource comprises a memory device, a central processing unit (CPU) core, a last level cache (LLC), or a memory bandwidth.

5. The method of claim 3, further comprising:
calculating, based on a fourth QoS parameter of a fourth compute instance running on the second computer, an interference coefficient of the fourth compute instance; and
scheduling, based on the interference coefficient, the fourth compute instance.

6. The method according to claim 3, further comprising:
making, after performing the QoS control, a determination that the third QoS parameter still exceeds the QoS parameter threshold; and
migrating the second compute instance in response to the determination.

7. A computer program product comprising instructions that are stored on a computer-readable medium and that, when executed by a processor, cause a compute instance provisioning system to:
collect a first usage of a first physical resource comprised in a first computer in the compute instance provisioning system, wherein the first computer is a physical component;
collect a second usage of a second physical resource occupied by a first compute instance running on the first computer, wherein the first compute instance is a virtual component;
calculate a remaining physical resource parameter in the first computer based on the first usage;
calculate a first quality of service (QoS) parameter of the first compute instance based on the second usage;
calculate a second QoS parameter of the first computer based on the first QoS parameter; and
migrate the first compute instance or creating a second compute instance in the compute instance provisioning system based on the first usage, the second usage, the remaining physical resource parameter, and the second QoS parameter.

8. The computer program product of claim 7, wherein the instructions further cause the compute instance provisioning system to:
obtain a compute instance scheduling request instructing migration of the first compute instance or creation of the second compute instance;
select, based on the remaining physical resource parameter and the second QoS parameter, a second computer in the compute instance provisioning system that can deploy the first compute instance or the second compute instance; and
deploy the first compute instance or the second compute instance on the second computer.

9. The computer program product of claim 7, wherein the instructions further cause the compute instance provisioning system to:
determine a second compute instance in the compute instance provisioning system whose third QoS parameter exceeds a QoS parameter threshold; and
perform QoS control on the second compute instance by:
isolating a third physical resource in a second computer on which the second compute instance is located for exclusive use by the second compute instance, or
scheduling a third compute instance running on the second computer.

10. The computer program product of claim 9, wherein the third physical resource comprises a memory device, a central processing unit (CPU) core, a last level cache (LLC), or a memory bandwidth.

11. The computer program product of claim 9, wherein the instructions further cause the compute instance provisioning system to:
calculate, based on a fourth QoS parameter of a fourth compute instance running on the second computer, an interference coefficient of the fourth compute instance; and
schedule, based on the interference coefficient, the fourth compute instance.

12. The computer program product according to claim 9, wherein the instructions further cause the compute instance provisioning system to:
make, after performing the QoS control, a determination that the third QoS parameter still exceeds the QoS parameter threshold; and migrate the second compute instance in response to the determination.

13. A compute instance provisioning system comprising:
a memory configured to store instructions; and
a processor coupled to the memory and configured to execute the instructions to cause the compute instance provisioning system to:
  collect a first usage of a first physical resource comprised in a first computer in the compute instance provisioning system, wherein the first computer is a physical component,
  collect a second usage of a second physical resource occupied by a first compute instance running on the first computer, wherein the first compute instance is a virtual component,
  calculate a remaining physical resource parameter in the first computer based on the first usage,
  calculate a first quality of service (QoS) parameter of the first compute instance based on the second usage,
  calculate a second QoS parameter of the first computer based on the first QoS parameter, and
  migrate the first compute instance or creating a second compute instance in the compute instance provisioning system based on the first usage, the second usage, the remaining physical resource parameter, and the second QoS parameter.

14. The compute instance provisioning system of claim 13, wherein the processor is further configured to execute the instructions to cause the compute instance provisioning system to:
  obtain a compute instance scheduling request instructing migration of the first compute instance or creation of the second compute instance;
  select, based on the remaining physical resource parameter and the second QoS parameter, a second computer in the compute instance provisioning system that can deploy the first compute instance or the second compute instance; and
  deploy the first compute instance or the second compute instance on the second computer.

15. The compute instance provisioning system of claim 13, wherein the processor is further configured to execute the instructions to cause the compute instance provisioning system to:
  determine a second compute instance in the compute instance provisioning system whose third QoS parameter exceeds a QoS parameter threshold; and
  perform QoS control on the second compute instance by:
    isolating a third physical resource in a second computer on which the second compute instance is located for exclusive use by the second compute instance, or
    scheduling a third compute instance running on the second computer.

16. The compute instance provisioning system of claim 15, wherein the third physical resource comprises a memory device, a central processing unit (CPU) core, a last level cache (LLC), or a memory bandwidth.

17. The compute instance provisioning system of claim 15, wherein the processor is further configured to execute the instructions to cause the compute instance provisioning system to:
  calculate, based on a fourth QoS parameter of a fourth compute instance running on the second computer, an interference coefficient of the fourth compute instance; and
  schedule, based on the interference coefficient, the fourth compute instance.

18. The method of claim 1, wherein the physical component is an entity having a compute capability.

19. The method of claim 18, wherein the entity is a personal computer (PC) or a server.

20. The method of claim 1, wherein the virtual component is a computational unit configured to run a service.

21. The method of claim 20, wherein the computational unit is a virtual machine (VM), a container, or a process.

22. The method of claim 1, wherein migrating the first compute instance or creating the second compute instance comprises creating the second compute instance.

23. The method of claim 4, wherein the third physical resource comprises the LLC.

24. The computer program product of claim 10, wherein the third physical resource comprises the LLC.

25. The compute instance provisioning system of claim 15, wherein the processor is further configured to execute the instructions to cause the compute instance provisioning system to:
  make, after performing the QoS control, a determination that the third QoS parameter still exceeds the QoS parameter threshold; and
  migrate the second compute instance in response to the determination.

26. The compute instance provisioning system of claim 16, wherein the third physical resource comprises the LLC.

* * * * *